(12) United States Patent
Khosrowshahi

(10) Patent No.: US 11,516,170 B2
(45) Date of Patent: *Nov. 29, 2022

(54) INTEGRATING A THIRD-PARTY PLATFORM INTO A COMMUNICATION PLATFORM

(71) Applicant: Slack Technologies, Inc., San Francisco, CA (US)

(72) Inventor: Farzad Khosrowshahi, Weehawken, NJ (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/111,408

(22) Filed: Dec. 3, 2020

(65) Prior Publication Data

US 2022/0182348 A1 Jun. 9, 2022

(51) Int. Cl.
*G06F 3/0481* (2022.01)
*H04L 51/42* (2022.01)
*G06F 3/04845* (2022.01)

(52) U.S. Cl.
CPC ............ *H04L 51/42* (2022.05); *G06F 3/0481* (2013.01); *G06F 3/04845* (2013.01); *G06F 2203/04803* (2013.01)

(58) Field of Classification Search
None
See application file for complete search history.

(56) References Cited

U.S. PATENT DOCUMENTS

| | | |
|---|---|---|
| 10,331,303 B1 * | 6/2019 | Gurtin .................. G06F 3/0482 |
| 2011/0161827 A1 | 6/2011 | Dedis et al. |
| 2015/0365306 A1 * | 12/2015 | Chaudhri .............. G06F 3/0484 |
| | | 715/736 |
| 2017/0134316 A1 | 5/2017 | Cohen et al. |
| 2018/0287982 A1 | 10/2018 | Draeger et al. |
| 2019/0028287 A1 | 1/2019 | Jin et al. |
| 2019/0220154 A1 * | 7/2019 | Muramoto .............. H04L 51/04 |

(Continued)

OTHER PUBLICATIONS

"Learn about Slack" (published on Oct. 28, 2015 by Slack) https://www.youtube.com/watch?v=9RJZMSsH7-g.*

(Continued)

*Primary Examiner* — Rinna Yi
(74) *Attorney, Agent, or Firm* — Lee & Hayes, P.C.

(57) ABSTRACT

Integrating a third-party platform into a communication platform to enable a user to interact with a third-party object from within the communication platform is described. In an example, an actuation mechanism can be associated with a reference to an object, associated with a third-party platform, presented via a user interface of the group-based communication platform. Based at least in part on detecting an input associated with the user interface, the object can be retrieved from the third-party platform. In an example, the object can be presented via the user interface, wherein one or more messages associated with the group-based communication platform are presented via a first section of the user interface and the object is presented via a second section of the user interface, and wherein the first section and the second section are presented simultaneously and are independently interactable.

20 Claims, 11 Drawing Sheets

(56) References Cited

U.S. PATENT DOCUMENTS

| | | |
|---|---|---|
| 2022/0051169 A1 | 2/2022 | Butterfield et al. |
| 2022/0182349 A1 | 6/2022 | Khosrowshahi et al. |

OTHER PUBLICATIONS

"Adobe Creative Cloud & Microsoft Teams bring creative work & teamwork together" https://www.youtube.com/watch?v=4vqjbCXU4j8 published on November Nov. 2, 2020.*

"Adobe Creative Cloud app for Microsoft Teams" https://www.youtube.com/watch?v=3kURNaFQs_0 published on Aug. 9, 2018.*

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019], Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9Md7d-9573-89d9598a4963/?context=1000516> (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36,2, (Dec. 2000) pp. 154-161.

Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/> (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

Microsoft,"Integreat with Microsoft Teams for Education App Platform" (Published on Nov. 16, 2020 by Microsoft 365) https://www.youtube.com/watch?v=Y2evhUWx9oC.

Office Action for U.S. Appl. No. 17/239,308, dated Dec. 29, 2021, Khosrowshahi, "Integrating a Communication Platform Into a Third-Party Platform", 9 pages.

Office Action for U.S. Appl. No. 17/239,308, dated Jun. 28, 2021, Khosrowshahi, "Integrating a Communication Platform Into a Third-Party Platform" 11 pages.

Office Action for U.S. Appl. No. 17/239,308, dated Apr. 8, 2022, Khosrowshahi, "Integrating a Communication Platform Into a Third-Party Platform", 14 pages.

International Search Report and Written Opinion for PCT Application No. PCT/US21/59990, dated Feb. 16, 2022.

* cited by examiner

INTEGRATING A THIRD-PARTY PLATFORM INTO A COMMUNICATION PLATFORM

TECHNICAL FIELD

A communication platform can leverage a network-based computing system to enable users to exchange data. In an example, users of the communication platform can communicate with other users via communication channels (or "channels"). A communication channel, or other virtual space, can be a data route used for exchanging data between and among systems and devices associated with the communication platform. For example, a communication channel may be established between and among various user computing devices, allowing the user computing devices to communicate and share data between and among each other over one or more networks. That is, in some examples, the communication platform can be a channel-based platform and/or hub for facilitating communication between and among users. In some examples, data associated with a communication channel can be presented via a user interface. In some examples, the user interface can present a data feed indicating messages posted to and/or actions taken with respect to a particular communication channel. In existing techniques, to access objects associated with, but external to, the communication platform, a user is required to leave the communication platform. As such, existing techniques require multiple interactions between the user and a user computing device and are therefore, inefficient.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
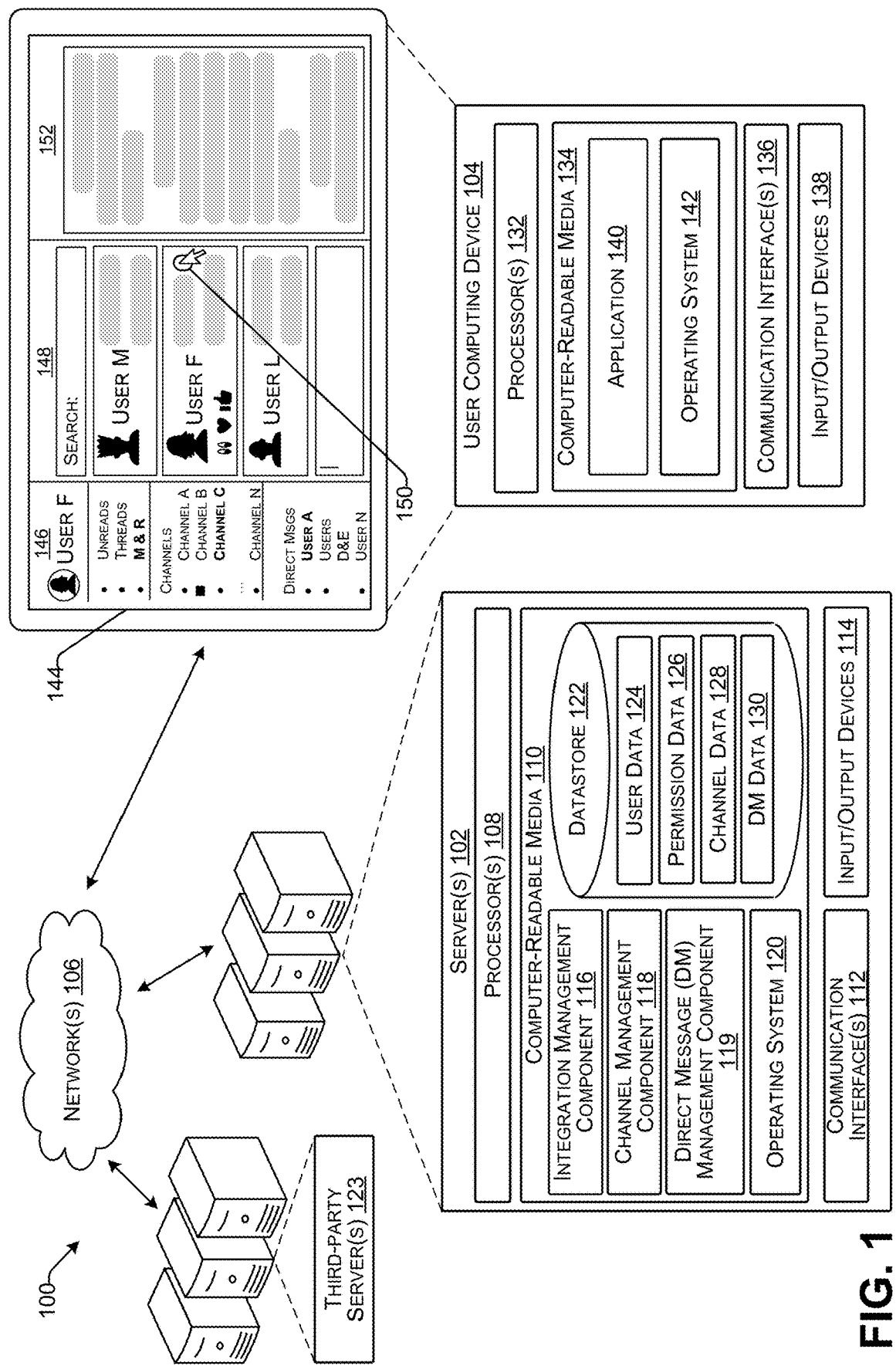
FIG. 1 illustrates an example environment for performing techniques described herein.

Integrating object(s) associated with third-party platform(s) (e.g., "third-party object(s)") into a communication platform is described. A communication platform, which, in some examples can be a group-based communication platform, a channel-based communication platform, a permission-based communication platform, channel-based messaging platform, and/or any other platform for facilitating communication between and among users, can enable users to access third-party objects from within the communication platform. That is, in at least one example, a third-party object can be integrated in the communication platform such that the third-party object can be accessed from within the communication platform. In at least one example, a user can request to access a third-party object from a user interface associated with the communication platform. The third-party object can be retrieved from the third-party platform and presented via the user interface, such that the user can view, edit, or otherwise interact with the third-party object via the user interface. That is, in an example, the user interface can be partitioned into two or more sections, wherein a first section can present data (e.g., message(s), indication(s) of interactions, etc.) associated with the communication platform and a second section can present the third-party object. In at least one example, the first section and second section can be presented at a same time and each can be independently interactable. As such, a user can interact with the communication platform and the third-party object without leaving the communication platform. That is, the user can open, view, and/or edit the third-party object within the context of the communication platform.

In some examples, functionality associated with the communication platform can be integrated into third-party platforms. For example, a third-party platform can present an actuation mechanism, or any other interaction mechanism, that can enable such functionality (associated with the communication platform) to be presented via the third-party platform. In some examples, based at least in part on detecting an input associated with the actuation mechanism, a user interface presented via the third-party platform can be partitioned into two or more sections, wherein a first section can present data associated with the third-party platform (e.g., a third-party object) and a second section can present a group-based communication user interface associated with the communication platform (and/or other data associated with the communication platform). In at least one example, the first section and second section can be presented at a same time and each can be separately interactable. As such, a user can interact with the communication platform without leaving the third-party platform. That is, the user can communicate on the communication platform within the context of the third-party platform.

Examples described herein are directed to integrating third-party objects, associated with third-party platforms, into a communication platform and/or integrating functionality associated with the communication platform into third-party platforms. In some examples, one or more instances of an application associated with the communication platform can be integrated in the communication platform and/or a third-party platform. In some examples, more than one third-party object can be integrated in the communication platform such that multiple, different objects, associated with the same or different third-party platforms can be opened, viewed, and/or edited via a user interface of the communication platform.

As described above, in existing techniques, for a user to access a third-party object, the user is required to leave the communication platform to open, view, and/or edit the object. This can require the user to toggle between multiple, different user interfaces, applications, platforms, and/or the like. Existing techniques are therefore inefficient and can be frustrating to users. Techniques described herein enable the integration of the communication platform with a third-party platform such that a user using the communication platform can open, view, and/or edit third-party objects without leaving the communication platform and/or a user using a third-party platform can communicate via the communication platform without leaving the third-party platform. As such, techniques described herein provide an improvement to existing systems by offering improved user interfaces. That is, by enabling the integration of third-party objects with a communication platform and/or a communication platform with a third-party platform, techniques described herein streamline user interaction with user interfaces. Furthermore, by reducing the number of windows or similar components required to access multiple objects, techniques described herein reduce processing and/or computing resources, thereby offering improvements to existing techniques.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to defined groups of users. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message, or otherwise communicate between or among each other.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include an integration management component 116, a channel management component 118, a direct message management component 119, an operating system 120, and a datastore 122.

In at least one example, the integration management component 116 can manage integration of third-party platforms with the communication platform and/or the communication platform with third-party platforms. A third-party platform, which can be associated with the third-party server(s) 123, can be external to the communication platform and can offer additional or alternative services than those offered by the communication platform. That is, the communication platform can be a "first-party platform" and the third-party platform can be external to the first-party platform, the communication platform. In an example, services of a third-party platform can be accessed via a third-party application, a web browser, or the like. In at least one example, a third-party platform can host, store, manage, or otherwise own one or more objects. An object can include a text document, an image, a video, or any other file or data item. An object created by a third-party platform can be a "third-party object" and can be hosted, stored, managed, or otherwise owned by the third-party platform.

In some examples, the integration management component 116 can facilitate the integration of the third-party platform into the communication platform. In some examples, a third-party platform can be integrated into a web browser experience associated with the communication platform. In some examples, a third-party platform can be integrated into a native application associated with the communication platform.

In some examples, a third-party platform can be integrated into the communication platform via a small software program (e.g., built on web technologies such as Hypertext Markup Language (HTML), JavaScript, Cascading Style Sheets (CSS), etc.) that can be used to customize a web browsing experience associated with the communication platform. In at least one example, such a small software program can be called an extension. In at least one example, an extension can be used to tailor (web) browser functionality and behavior to needs or preferences of a platform (e.g., the communication platform, a third-party platform, etc.). In some examples, a developer can install such an extension into the communication platform. In at least one example, the extension can cause a frame, such as an iframe, to be loaded within a web browser within which the communication platform is accessible (e.g., in response to detecting input associated with an actuation mechanism with which a third-party object is associated and/or receiving a request for a third-party object). In some examples, the frame can access content associated with the third-party platform and write content associated therewith into the frame. As such, a requested third-party object can be presented via the frame within a user interface of the communication platform (e.g., presented via a web browser).

In some examples, a third-party platform can be integrated into the communication platform by embedding an embeddable browser (e.g., a webview) into a native application associated with the communication platform. In such examples, the native application can use the embeddable browser to display web content inline in the native application. That is, in such examples, the native application can have a browser engine embedded therein that can programmatically load content (e.g., third-party object(s)) in a user interface, as described herein. In some examples, such content can be loaded into a frame, such as an iframe. As such, a requested third-party object can be presented via the frame within a user interface of the communication platform (e.g., presented via the native application).

In some examples, the integration management component 116 can facilitate integration of functionality associated with the communication platform into third-party platforms. In some examples, the communication platform can be integrated into a web browser experience associated with a third-party platform. In some examples, the communication platform can be integrated into a native application associated with the third-party platform.

In some examples, the communication platform can be integrated into a third-party platform via a small software program (e.g., an extension), as described above. In some examples, a developer (associated with a third-party platform) can install such an extension into the third-party platform. In at least one example, the extension can cause a frame, such as an iframe, to be loaded within a web browser within which the third-party platform is accessible. In some examples, the frame can access content associated with the communication platform and write content associated therewith into the frame. In some examples, the communication platform can be associated with security restrictions that limit the ability for the communication platform to be framed into an external website (e.g., a website associated with a different domain, for example). As such, in some examples, when the frame associated with the communication platform is requested, the extension can be configured to redirect to the communication platform, which can rewrite content associated with the communication platform and the third-party platform within two frames. This can provide an experience as though the user is operating within the third-party platform, but, due to the security restrictions, can be hosted by the communication platform.

In some examples, the communication platform can be integrated into the third-party platform by embedding an embeddable browser (e.g., a webview) into a native application associated with the third-party platform. In such examples, the native application can use the embeddable browser to display web content. That is, in such examples, the native application can have a browser engine embedded therein that can programmatically load content (e.g., third-party object(s)) in a user interface, as described herein. In some examples, such content can be loaded into a frame, such as an iframe.

In some examples, the frame associated with the third-party platform content can be one of multiple frames associated with a user interface associated with the communication platform (e.g., presented via a web browser or native application). For example, a first frame can be used to present data associated with the communication platform and a second frame can be used to present data associated with a third-party platform. In such examples, the first frame can point to the communication platform and the second frame can point to an external document, but both frames can be presented within a same user interface of the communication platform. As described herein, data associated with both frames can be independently interactable. In some examples, the extension can be configured to create a bidirectional connection to enable communication between the frames.

In at least one example, based at least in part on integrating the third-party platform with the communication platform, references to objects associated with the third-party platform (e.g., a "third-party object") can be annotated with an actuation mechanism. For the purpose of this discussion, an "actuation mechanism" can be any mechanism with which an interaction causes an operation to be performed. That is, an actuation mechanism can be an interaction mechanism that causes an operation to be performed. In some examples, the integration management component 116 can analyze data associated with a user interface of the communication platform to identify references to third-party objects. The integration management component 116 can cause an actuation mechanism to be associated with a reference to a third-party object. The actuation mechanism, which can be associated with a link or other mechanism, can cause the third-party object to be presented via a user interface of the communication platform via a frame, as described below. In some examples, the third-party object can be presented "in context" of the communication platform so that a user can interact with the communication platform and the third-party object within a user interface of the communication platform. In at least one example, the third-party object can be interactable such that a user can edit the third-party object within the user interface of the communication platform. Additional details are provided below.

In an example where functionality associated with the communication platform is integrated into a third-party platform, a user interface of the third-party platform, which can be presented via an application, a web browser, or the like, can include an actuation mechanism associated with the communication platform. Based at least in part on receiving an indication that the actuation mechanism has been actuated, the integration management component 116 can cause data associated with the communication platform to be presented via the user interface. In some examples, such data can be presented as a group-based communication user interface associated with the communication platform. As such, a user can interact with the third-party platform and the communication platform via a same user interface. Additional details are provided below.

In at least one example, the channel management component 118 can manage communication channels (i.e., "channels") of the communication platform. In at least one example, the communication platform can be "channel-based" such that the platform can be organized into communication channels having security (that can be defined by permissions) to limit access to defined groups of users (e.g., members of the communication channels). A communication channel, or virtual space, can be a data route used for exchanging data between and among systems and devices associated with the communication platform. In some examples, a communication channel may be "public," which may allow any user within a group (e.g., associated with an organization identifier, associated with a workspace identifier, etc.) with which the communication channel is associated to join and participate in the data sharing through the communication channel. In some examples, a communication channel may be "private," which may restrict data communications in the communication channel to certain users or users having particular roles (e.g., managers, administrators, etc.) and/or types (e.g., verified, etc.).

In some examples, a communication channel may be "shared," which may allow users associated with two or more different groups (e.g., entities associated with two or more different organization and/or workspace identifiers) to join and participate in the data sharing through the communication channel. A shared communication channel may be public such that it is accessible to any user of groups associated with the shared communication channel, or may be private such that it is restricted to access by certain users or users having particular roles and/or types. A "shared communication channel" or an "externally shared communication channel" can enable two or more organizations, such as a first organization and a second organization to share data, exchange communications, and the like. In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared communication channel can be shared with one or more different workspaces and/or organizations that, without having a shared communication, would not otherwise have access to each other's data by the nature of the permission-based and/or group-based configuration of the communication platform described herein.

In at least one example, the channel management component 118 can receive a request to generate a communication channel. In some examples, the request can include a name that is to be associated with the communication channel, one or more users to invite to join the communication channel, and/or permissions associated with the communication channel. In at least one example, one or more user identifiers associated with one or more users and/or one or more user accounts can be mapped to, or otherwise associated with, a communication channel (e.g., a communication channel identifier associated therewith). User(s) associated with a communication channel can be "members" of the communication channel. Members of a communication channel can communicate with other members via the communication channel. That is, in at least one example, the channel management component 118 can establish a communication channel between and among various user computing devices associated with user identifiers associated with the communication channel, allowing the user computing devices to communicate and share data between and among each other. As described herein, in some examples, such communication and/or sharing of data can be via one or more messages that can be exchanged via a communication channel. In at least one example, the channel management component 118 can manage such communications and/or sharing of data. In some examples, data associated with a communication channel can be presented via a user interface.

As described above, in at least one example, one or more permissions can be mapped to, or otherwise associated with, a communication channel and/or members associated therewith. Such permission(s) can indicate which user(s) have permission to access the communication channel, actions and/or messages permitted in the communication channel, which user(s) and/or type(s) of users are permitted to add or remove members, which user(s) and/or types of users are permitted to share the communication channel with other users, a retention policy associated with data in the communication channel, whether the communication channel is public or private, or the like.

In at least one example, the direct message management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform. In some examples, a direct message can be a private message between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message management component 119 can receive a request to generate a direct message. In some examples, the request can include identifiers associated with one or more users that are intended recipient(s) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, permission data 126, channel data 128, and direct message (DM) data 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations, groups, or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on communication channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual communication channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a communication channel can be mapped to, or otherwise associated with, data associated with the communication channel in the channel data 128. In some examples, permissions can indicate restrictions on individual communication channels, restrictions on user(s) associated with individual communication channels, and the like.

In some examples, the permission data 126 can indicate which third-party platforms can be integrated into the communication platform for particular groups (e.g., organizations, workspaces), communication channels, direct messages, and/or the like. In some examples, the permission data 126 can be set by administrators or other users having particular roles associated with the ability to set permissions.

In at least one example, the channel data 128 can store data associated with individual communication channels. In at least one example, the channel management component 118 can establish a communication channel between and among various user computing devices, allowing the user computing devices to communicate and share data between and among each other. In at least one example, a communication channel identifier may be assigned to a communication channel, which indicates the physical address in the channel data 128 where data related to that communication channel is stored.

In at least one example, the DM data 130 can store data associated with individual direct messages. In at least one example, the direct message management component 119 can establish a direct message between and among various user computing devices, allowing the user computing devices to communicate and share data between and among each other via the direct message. In at least one example, a direct message identifier may be assigned to a direct message, which indicates the physical address in the DM data 130 where data related to that direct message is stored.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), communication channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored. In some examples, a database shard can store data related to two or more groups (e.g., as in a shared channel).

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), HypterText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

In some examples, the application 140 can annotate a user interface with indication(s) of third-party platform integration, as described below, and can facilitate the retrieval of a third-party object (e.g., from the third-party server(s) 123) for presentation via a user interface of the communication platform. Additional details are provided below. In additional or alternative examples, as described above, third-party platforms can be integrated into the communication platform via an extension. In such an example, a web browser can annotate a user interface with indication(s) of third-party platform integration, as described below, and can facilitate the retrieval of a third-party object (e.g., from the third-party server(s) 123) for presentation via a user interface of the communication platform (e.g., instead of or in addition to the application 140).

A non-limiting example of a user interface 144 is shown in FIG. 1. As illustrated in FIG. 1, the user interface 144 can present data associated with one or more communication channels. In some examples, the user interface 144 can include a first section 146 (e.g., which can be a portion, pane, or other partitioned unit of the user interface 144), that includes indicator(s) (e.g., user interface element(s) or object(s)) representing data associated with communication channel(s), direct message(s), etc. with which the user (e.g., account of the user) is associated. Additional details associated with the first section 146 and indicator(s) are described below with reference to FIG. 2A.

In at least one example, the user interface 144 can include a second section 148 (e.g., which can be a portion, pane, or other partitioned unit of the user interface 144) that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the second section 148 can be associated with the same or different workspaces. That is, in some examples, the second section 148 can present data associated with the same or different workspaces via an integrated feed. In some examples, the data can be organized and/or is sortable by date, time (e.g., when associated data is posted or an associated operation is otherwise performed), type of action and/or data, workspace, communication channel, user, topic, relevance metric, and/or the like. In some examples, such data can be associated with an indication of which user (e.g., member of the communication channel) posted the message and/or performed an action. In examples where the second section 148 presents data associated with multiple workspaces, at least some data can be associated with an indication of which workspace the data is associated with.

In at least one example, the first section 146 and the second section 148, in combination, can be associated with a "group-based communication user interface" from which a user can interact with the communication platform. Additional details associated with the user interface 144, the first section 146, and the second section 148, are described below with reference to FIG. 2A.

In at least one example, references to third-party objects within the user interface 144 can be annotated with respective actuation mechanisms. An example of such an actuation mechanism 150 is shown in FIG. 1. In some examples, such an actuation mechanism 150 may appear so long as the permission data 126 indicates that the user, communication channel, direct message, group, and/or the like is permitted to access objects from the corresponding third-party platform (e.g., that the third-party platform is integrated and the relevant entity has permission to access objects of that third-party platform). If permission data 126 indicates that the user, communication channel, direct message, group, and/or the like is not permitted to access the object and/or third-party platform, the actuation mechanism 150 may not be presented or may be disabled (e.g., grayed out or the like). In at least one example, based at least in part on detecting an input associated with the actuation mechanism 150, the third-party object associated therewith can be presented in a third section 152 of the user interface 144 (e.g., which can be a portion, pane, or other partitioned unit of the user interface 144). In at least one example, actuation of the actuation mechanism 150 can cause the third-party object to be retrieved (e.g., from the third-party server(s) 123) and opened within the user interface 144. In at least one example, a user can view and/or interact (e.g., edit) the third-party object via the third section 152. In at least one example, the first section 146 and the second section 148 can be presented via a first frame (e.g., iframe) and the third section 152 can be presented via a second frame (e.g., iframe). That is, section(s) of the user interface 144 associated with the communication platform can be presented via a first frame and a section of the user interface 144 associated with the third-party platform can be presented via a second frame. Additional details are provided below.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the integration management component 116, the channel management component 118, the direct message management component 119, and the application 140, techniques described herein can be performed by any other component, or combination of components, which can be associated with the server(s) 102, the user computing device 104, or a combination thereof.

Figure 2A:
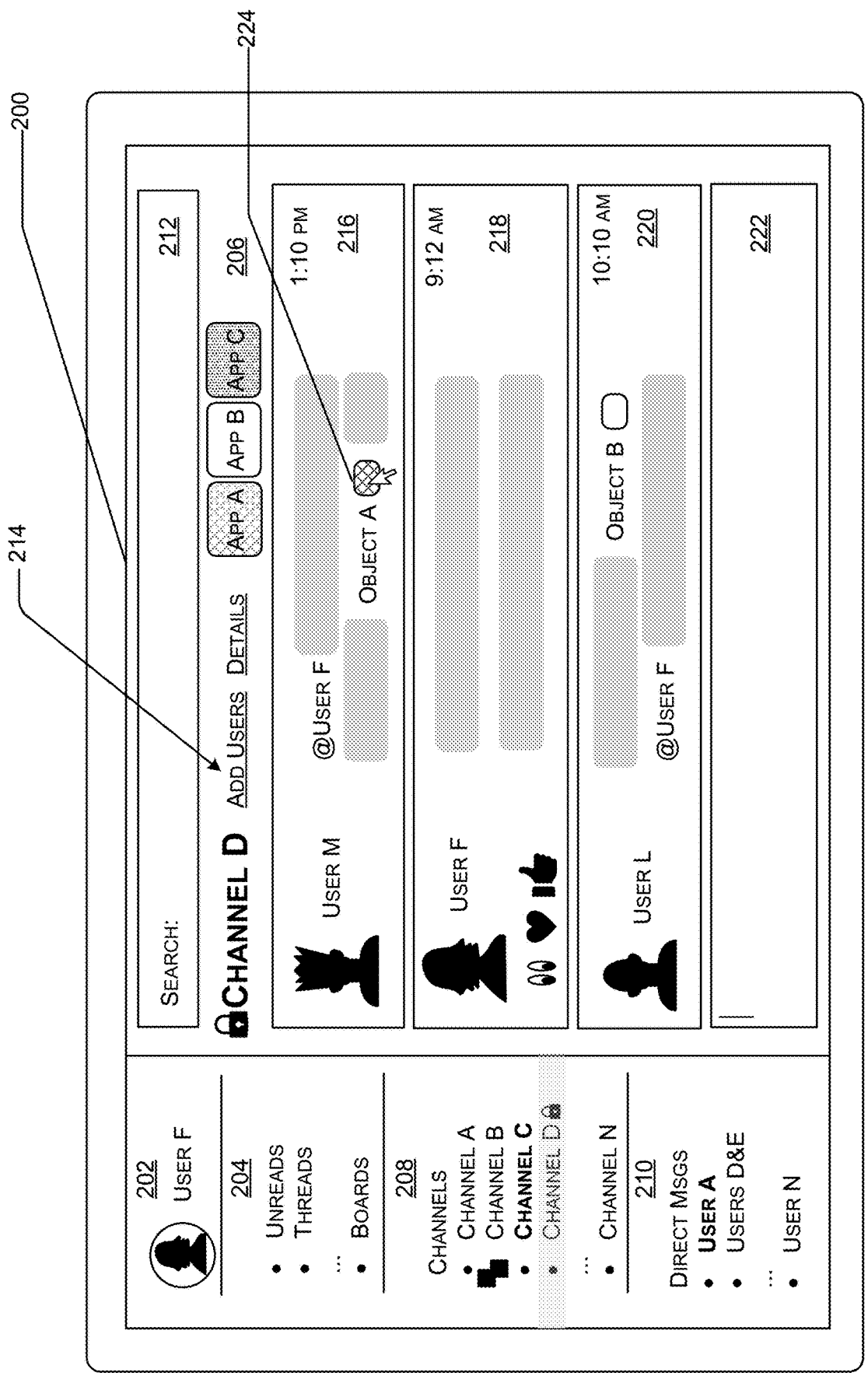
FIG. 2A illustrates an example user interface presented via a communication platform, as described herein.

FIG. 2A illustrates an example user interface 200 presented via a communication platform, as described herein. The user interface 200 can correspond to the user interface 144 described above with reference to FIG. 1. As described above, in some examples, a user interface 200 presented via the communication platform can include a first section 202 (which can correspond to the first section 146 described above with reference to FIG. 1) that includes indicator(s) (e.g., user interface element(s) or object(s)) representing virtual space(s) associated with the workspace(s) with which the user (e.g., account of the user) is associated. In at least one example, the first section 202 can include one or more sub-sections, which can represent different virtual spaces. For example, a first sub-section 204 can include indicators representing virtual spaces that can aggregate data associated with a plurality of communication channels and/or workspaces. In at least one example, each virtual space can be associated with an indicator in the first sub-section 204. In some examples, an indicator can be associated with an actuation mechanism, that when actuated, can cause the application 140 to present data associated with the corresponding virtual space via a second section 206 of the user interface 200 (which can correspond to the second section 148 described above with reference to FIG. 1).

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 206, for example in a feed. In another example, "threads" can be associated with messages, files, etc. posted in threads to messages posted in a communication channel and/or a virtual space associated with "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. In some examples, if the user requests to access the virtual space associated with "snippets of content," snippets of content associated with the user, which can be associated with different communication channels and/or virtual spaces, can be presented via a same feed. In some examples, such data can be organized and/or is sortable by date, time (e.g., when associated data is posted or an associated operation is otherwise performed), type of action and/or data, workspace, communication channel, user, topic, relevance metric, and/or the like. In some examples, such data can be associated with an indication of which user (e.g., member of the communication channel) posted the message, performed an action, and/or the like. Additional details are described below.

In at least one example, the first section 202 of the user interface 200 can include a second sub-section 208 that includes indicators representing communication channels. In some examples, the communication channels can include public channels, private channels, shared channels (e.g., between workspaces or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In some examples, the communication channels represented can be associated with combinations of communication channels associated with a single workspace and communication channels associated with different workspaces.

In some examples, the second sub-section 208 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 208 can depict all communication channels, or a subset of all communication channels, that the user is a member of, and the user can interact with the user interface 200 to browse or view other communication channels that the user is not a member of but are not currently displayed in the second sub-section 208. In some examples, different types of communication channels (e.g., public, private, shared, etc.) can be in different sections of the second sub-section 208, or can have their own sub-sections or sub-sections in the user interface 200. In some examples, communication channels associated with different workspaces can be in different portions of the second sub-section 208, or can have their own sections or sub-sections in the user interface 200.

In some examples, the indicators can be associated with user interface elements that visually differentiate types of communication channels. For example, Channel B is associated with a double square user interface element instead of a circle user interface element. As a non-limiting example, and for the purpose of this discussion, the double square user interface element can indicate that the associated communication channel (e.g., Channel B) is an externally shared communication channel. In some examples, such a user interface element can be the same for all externally shared communication channels. In other examples, such a user interface element can be specific to the other group with which the externally shared communication channel is associated. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 208 of the user interface 200. In such examples, the user may navigate to a different interface (not shown) to browse additional channels that are accessible to the user but to which the user is not currently a member.

In addition to the second sub-section 208, the first section 202 can include a third sub-section 210 that can include indicators representative of direct messages. That is, the third sub-section 210 can include indicators representative of virtual spaces that are associated with private messages between one or more users, as described above.

As described above, in at least one example, the user interface 200 can include a second section 206 that can be associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the second section 206 can be associated with the same or different workspaces. That is, in some examples, the second section 206 can present data associated with the same or different workspaces via an integrated feed. In some examples, the data can be organized and/or is sortable by date, time (e.g., when associated data is posted or an associated operation is otherwise performed), type of action and/or data, workspace, communication channel, user, topic, relevance metric, and/or the like. In some examples, such data can be associated with an indication of which user posted the message and/or performed an action.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), application(s), etc.

A communication channel or other virtual space can be associated with data and/or content other than messages, or data and/or content that is associated with messages. For example, non-limiting examples of additional data that can be presented via the second section 206 of the user interface 144 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc. In some examples, objects, which can comprise files, applications, and/or the like, can be associated with a communication channel or other virtual space (e.g., a direct message). In some examples, such objects can be associated with one or more third-party platforms. That is, in some examples, individual third-party objects can be referenced in the second section 206.

In some examples, the second section 206 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications and/or objects) can be displayed to each member of the communication channel. For instance, a common set of group-based messaging communications can be displayed to each member of the communication channel such that the content of the communication channel (e.g., messaging communications and/or objects) may not vary per member of the communication channel. In some examples, messaging communications associated with a communication channel can appear differently for different users (e.g., based on personal configurations, group membership, permissions, policies, etc.).

In at least one example, the format of the individual communication channels or virtual spaces may appear differently to different users. In some examples, the format of the individual communication channels or virtual spaces may appear differently based on which workspace or organization a user is currently interacting with or most recently interacted with. In some examples, the format of the individual communication channels or virtual spaces may appear differently for different users (e.g., based on personal configurations, group membership, permission(s), etc.).

In at least one example, the user interface 200 can include a search mechanism 212, wherein a user can input a search term and the server(s) 102 can perform a search associated with the communication platform. In some examples, the search can be performed across each group with which the user is associated, or the search can be restricted to a particular group, based on a user specification.

In FIG. 2A, the user can interact with the user interface element that corresponds to Channel D in the second subsection 208 and as such, a feed associated with the communication channel can be presented via the second section 206 of the user interface. In some examples, the second section 206 can be associated with a header that includes user interface elements 214 representing information associated with Channel D. Furthermore, the second section 206 can include user interface elements 216-220 which each represent messages posted to the communication channel. As illustrated, the user interface elements 216-220 can include an indication of a user who posted the message, a time when the message was posted, content associated with the message, reactions associated with the message, and/or the like. In at least one example, the second section 206 can include an input mechanism 222, which can be associated with a message composition user interface to enable a user to compose a message to be posted to the communication channel.

In at least one example, one or more of the user interface elements 214 can indicate one or more third-party platforms that are integrated into the communication platform and/or the communication channel. As illustrated, three different third-party platforms are integrated into the communication platform and/or the communication channel, but more or less than three third-party platforms can be integrated into a communication platform and/or communication channel. In some examples, the third-party platform(s) shown can be the third-party platform(s) of which the permission data 126 permits the user, communication channel, direct message, and/or the like to access. As illustrated, a third-party application associated with each third-party platform is integrated into the communication platform and/or the communication channel (e.g., "App A," "App B," and "App C"). In some examples, each of the third-party platforms can be associated with a user interface element, which can be a textual element, graphical element, logo, etc. In some examples, such a user interface element can be an actuation mechanism that, when actuated, can cause reference(s) to object(s) associated with the respective third-party application to be annotated with an actuation mechanism to enable retrieval of the object(s). In some examples, such indicator(s) can be associated with an additional or alternative component of the user interface (e.g., the browser bar, a sidebar, etc.).

In at least one example, a third-party platform can be integrated into the communication platform using techniques described above such that any user and/or group can access functionality associated with the third-party platform (subject to permission(s)). In some examples, different third-party platforms can be integrated into different communication channels and/or direct messages. That is, in some examples, a third-party platform can be integrated with the communication platform and mapped to, or otherwise associated with, individual communication channels or direct messages. In some examples, access to functionality associated with such a third-party platform can be controlled by permission(s) associated with the communication channels and/or direct messages (e.g., the permission data 126). In some examples, different third-party platforms can be integrated into different groups. That is, in some examples, a third-party platform can be integrated with and mapped to, or otherwise associated with, a particular group (e.g., organization, workspace, etc.). In some examples, access to functionality associated with such a third-party platform can be controlled by permission(s) associated with the particular group.

In some examples, the user interface 200 can be annotated with actuation mechanisms indicating that individual objects in the user interface 200 are accessible via one or more integrated third-party platforms. In some examples, individual actuation mechanisms can correspond to the user interface element representative of the third-party platform (e.g., of the user interface elements 214). In at least one example, the actuation mechanism can comprise a link or other mechanism that, when actuated, can cause a corresponding object to be presented via the user interface 200. That is, such an actuation mechanism can cause the object to be retrieved from the third-party platform, opened within the user interface 200, and interactable via the user interface 200.

Figure 2B:
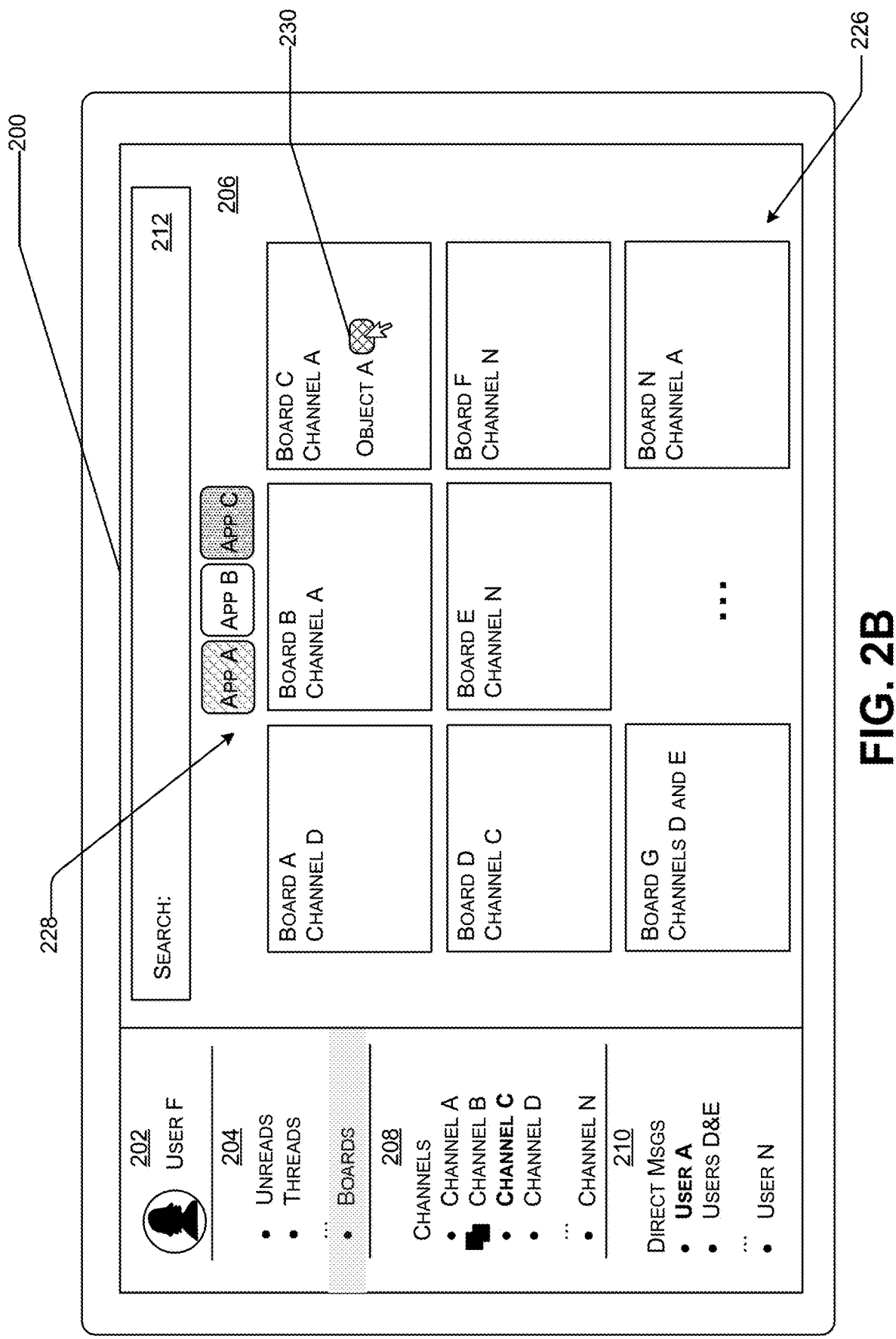
FIG. 2B illustrates another example user interface presented via a communication platform, as described herein.

In some examples, the user interface 200 can present additional or alternative data associated with the communication platform. For instance, in some examples, the user interface 200 can present one or more boards from which third-party objects can be accessed, as illustrated in FIG. 2B. In at least one example, boards, as described herein, can be associated with individual groups and/or communication channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such information can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like. Additional details associated with boards are provided in U.S. patent application Ser. No. 16/993,859, filed on Aug. 14, 2020, the entire contents of which are incorporated by reference herein.

A non-limiting example of the user interface 200 presenting one or more boards is illustrated in FIG. 2B. As illustrated in FIG. 2B, the second section 206 comprises multiple boards 226. In at least one example, an interaction with one of the boards 226 can cause the corresponding board to be presented via the user interface 200 (e.g., in the second section 206, for example). In at least one example, one or more user interface elements 228 can indicate one or more third-party platforms that are integrated into the communication platform. As illustrated, three different third-party platforms are integrated into the communication platform, but more or less than three third-party platforms can be integrated into a communication platform and/or communication channel. Similar to what is described above, if a user does not have permission (e.g., per the permission data 126) to access a particular third-party application, such a third-party application may not be presented (e.g., in the user interface element(s) 228). That is, in at least one example, the user interface element(s) 228 can represent third-party platforms that have been (i) integrated into the communication platform and (ii) are accessible to the user per permission data 126. In at least one example, each of the third-party platforms can be associated with a user interface element, which can be a textual element, graphical element, logo, etc. In some examples, such a user interface element can be an actuation mechanism that, when actuated, can cause reference(s) to object(s) associated with the respective third-party application to be annotated with an actuation mechanism to enable retrieval of the object(s), as described above. An example of such an actuation mechanism 230 is illustrated in FIG. 2B. In some examples, if a board, a communication channel with which a board is associated, and/or a group with which a board is associated does not have permission to access a particular third-party application, object(s) associated with the third-party application may not be annotated or an actuation mechanism associated therewith can be disabled.

Figure 3:
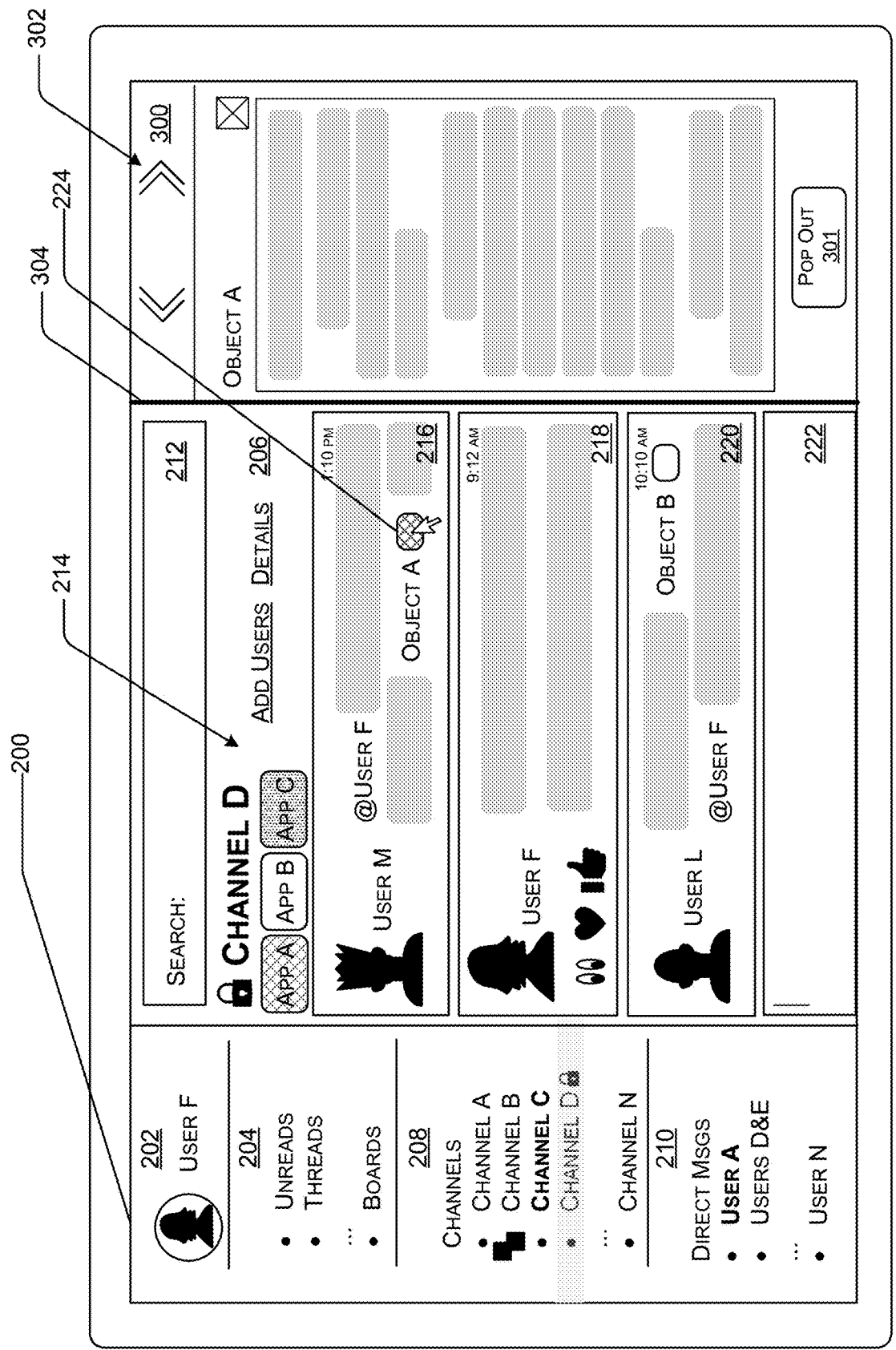
FIG. 3 illustrates an example of a user interface, wherein a third-party object is presented within the user interface.

FIG. 3 illustrates an example of the user interface 200 described in FIG. 2A, wherein a third-party object is presented within in the user interface 200. In at least one example, based at least in part on detecting an input associated with the actuation mechanism 224, the corresponding third-party object (e.g., Object A) can be retrieved from the third-party platform and can be presented in another section (e.g., a third section 300) of the user interface 200. The third section 300 can correspond to the third section 152 described above with reference to FIG. 1. In at least one example, the third section 300 of the user interface 200 can be presented at the same time as the first section 202 and the second section 206. The third-party object can be presented by the third section 300 to enable the user to view, edit, and/or otherwise interact with the third-party object while interacting with the communication platform. That is, the third-party object (e.g., Object A) can be presented in context. In at least one example, the user can send a message via the second section 206 while editing the third-party object in the third section 300.

In some examples, as described above, the first section 202 and the second section 206 can be presented via a first frame (e.g., iframe) and the third section 300 can be presented via a second frame (e.g., iframe). In at least one example, both the first frame and the second frame can be presented via the user interface 200 at the same time. In some examples, the second frame can pop out of the instance of the communication platform and can be snapped back into the instance of the communication platform. That is, in some examples, based at least in part on receiving a request to extract the third-party object (e.g., via an input associated with the second section 206 and/or an actuation mechanism 301 associated therewith), the second section can be presented via a new user interface, frame, and/or window external to the user interface. In some examples, the user can request to minimize, close, or otherwise collapse the new user interface, frame, and/or window back into the user interface 200. In some examples, the first frame and the second frame can be independently interactable, such that a user can interact with data presented via each frame without affecting content in the other frame. In some examples, actuation of the actuation mechanism 224 can cause the user interface 200 to be updated to include the frames. In some examples, the first frame can retrieve and render data from the communication platform and the second frame can retrieve and render data from the third-party platform. As described above, in some examples, the second frame can point to the communication platform that can then retrieve and render data associated with the third-party platform.

In some examples, the third section 300 can include one or more user interface elements 302 that can be used to scroll through additional third-party objects that have been accessed (e.g., opened) via the communication platform. In some examples, by interacting with the user interface element(s) 302, the user can access additional or alternative third-party object(s), which can be presented via the third section 300. In some examples, the individual third-party object(s) can be associated with a same third-party platform. In some examples, the individual third-party object(s) can be associated with different third-party platforms. In some examples, the permission data 126 can control which of the previously accessed third-party objects can be accessed by interacting with the user interface element(s) 302.

In some examples, a third-party object and/or the third section 300 can be presented via the third section 300 so long as a user is interacting with a particular group, communication channel, direct message, and/or the like. That is, in some examples, a third-party object and/or the third section 300 can be mapped to, or otherwise associated with, a particular group (e.g., organization, workspace, etc.) such that so long as a user is interacting with the group, the third-party object and/or third section 300 can be presented via the user interface 200. However, when the user navigates away from the particular group, the third-party object and/or third section 300 may no longer be presented via the user interface 200. In some examples, when the user returns to the particular group, the third-party object and/or third section 300 can again be presented via the user interface 200. As another example, in some examples, a third-party object and/or the third section 300 can be mapped to, or otherwise associated with, a particular communication channel such that so long as a user is interacting with the communication channel, the third-party object and/or third section 300 can be presented via the user interface 200. However, when the user navigates away from the particular communication channel, the third-party object and/or third section 300 may no longer be presented via the user interface 200. In some examples, when the user returns to the particular communication channel, the third-party object and/or third section 300 can again be presented via the user interface 200. Similar mapping and/or "stickiness" can apply for direct messages and/or the like.

Figure 4:
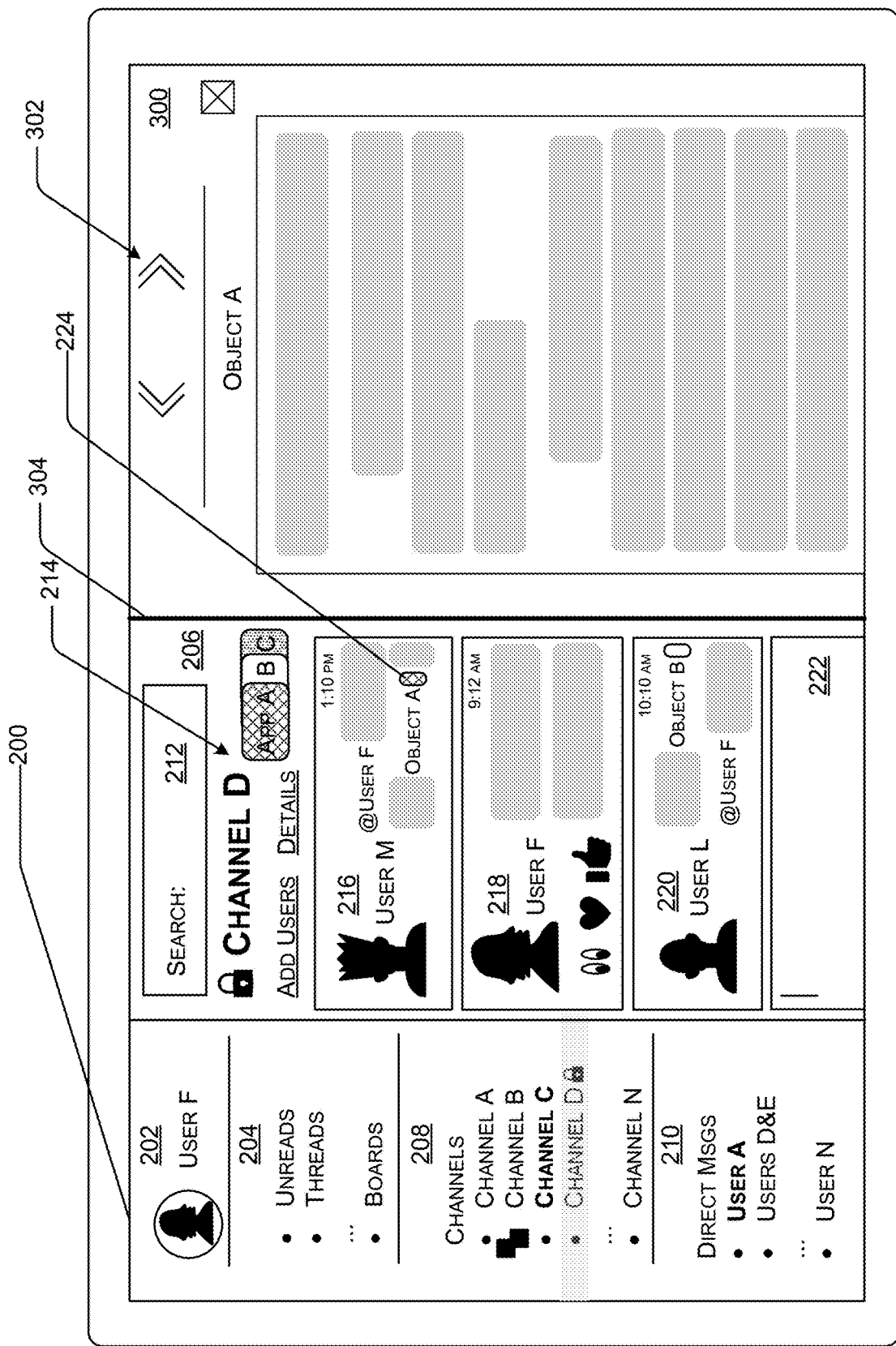
FIG. 4 illustrates another example of a user interface, wherein a section presenting a third-party object has been resized via a resizing mechanism.

In some examples, the third section 300 can be associated with a resizing mechanism to enable resizing of the third section 300 (and, consequently, at least the second section 206). In at least one example, based at least in part on receiving a request to resize (e.g., expand or contract the width, height, etc.) the third section 300 (e.g., an input associated with the resizing mechanism), the application 140 can update the user interface 200 so that the second section 206 and the third section 300 reflect the new sizes. In some examples, the application 140 can rearrange user interface elements associated with the second section 206 based at least in part on resizing the second section 206. FIG. 4 illustrates an example wherein the third section 300 has been resized. As illustrated in FIG. 4, one or more of the user interface elements presented via the second section can be reconfigured to fit the new size of the second section 206.

Figure 5:
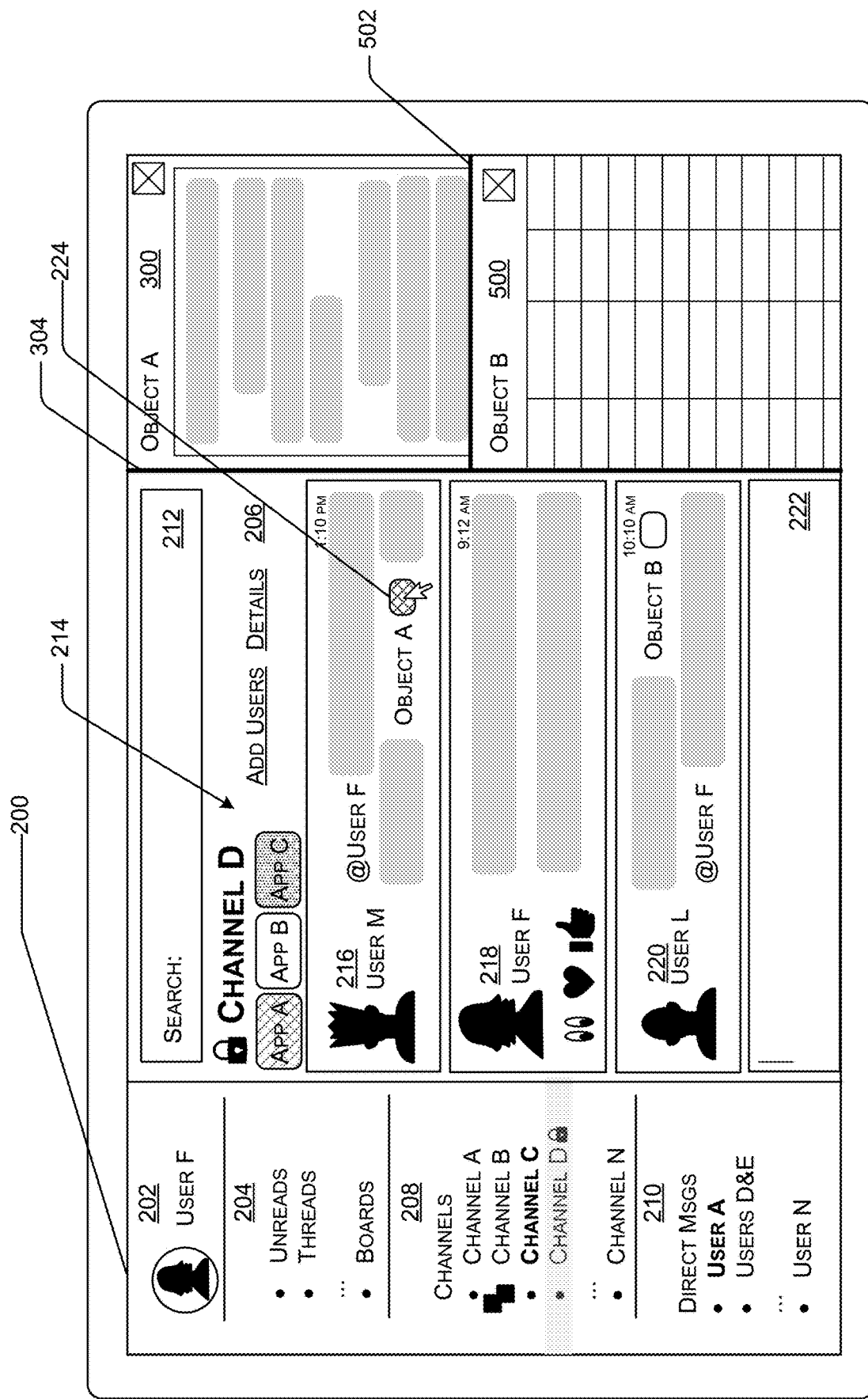
FIG. 5 illustrates another example of a user interface, wherein multiple third-party objects are presented within the user interface.

In at least one example, more than one third-party object can be retrieved and presented via section(s) of the user interface 200. In some examples, as described above, each third-party object that has been retrieved (e.g., for a communication channel) can be accessible by interacting with the user interface elements 302. In such examples, different third-party objects can be presented via the third section 300. In some examples, each third-party object can be associated with its own section of the user interface 200. For example, as illustrated in FIG. 5, a first third-party object can be presented via the third section 300 and a second third-party object can be presented via a fourth section 500. In at least one example, the third section 300 and the fourth section 500 can be presented within the user interface 200 (e.g., in context of the communication platform). In some examples, the third section 300 and the fourth section 500 can each be presented via their own frames. In at least one example, the third section 300 and the fourth section 500 can be independently interactable. In some examples, the third-party objects can be associated with the same third-party platform. In some examples, the third-party objects can be associated with different third-party platforms. In some examples, another instance of the communication platform can be presented via the user interface 200 (e.g., in another section).

In some examples, a third-party platform can comprise multiple applications. For example, an internet-related services company can include a cloud-based word processing application, a cloud-based spreadsheet application, a cloud-storage application, and/or the like. In such examples, each application can be presented via a different section and/or frame. For instance, in FIG. 5, the first third-party object can be associated with a first application associated with a third-party platform and the second third-party object can be associated with a second application associated with the same third-party platform. In some examples, third-party objects presented via sections, as described above with reference to FIG. 5, can be associated with different applications of a same third-party platform, same applications of a same third-party platform, different applications of different third-party applications, and/or the like.

In some examples, one or more resizing mechanisms can enable the section(s) to be resized. That is, the resizing mechanism 304, as described above, can enable a user to resize (e.g., expand or contract) the width of the third section 300 and/or fourth section 500 (and thus, the first section 202 and second section 206). In some examples, a resizing mechanism 502 can enable a user to resize (e.g., expand or contract) the height of the third section 300 and/or the fourth section 500. In some examples, based at least in part on resizing the height and/or the width of one of the third section 300 and/or the fourth section 500, data associated with other section(s) can be reconfigured based at least in part on the resized sections.

Figure 6:
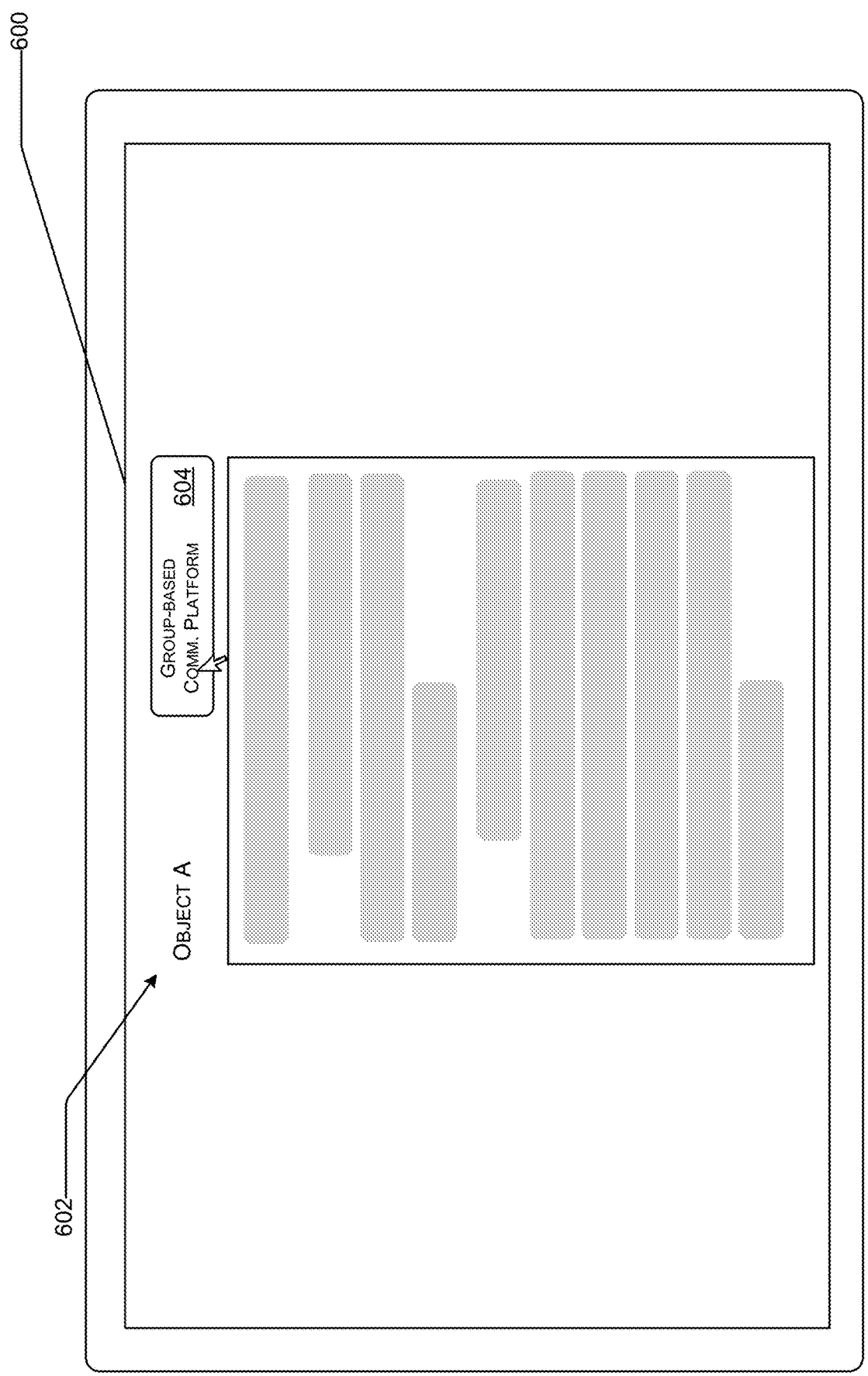
FIG. 6 illustrates an example of a user interface presented via a third-party platform.

FIG. 6 illustrates an example of a user interface 600 presented via a third-party platform. In at least one example, the user interface 600 can be presented via an application, a web browser, or other access point, associated with the third-party platform. In at least one example, the user interface 600 can present an object 602, associated with the third-party platform, that the user can interact with (e.g., view, edit, etc.). In some examples, the user interface 600 can include an actuation mechanism 604 that can cause a group-based communication user interface associated with the communication platform to be presented via a user interface with the object 602. In some examples, the actuation mechanism 604 can be a control, as shown. In some examples, the actuation mechanism 604 can be associated with a pop-up, overlay, or the like.

Figure 7:
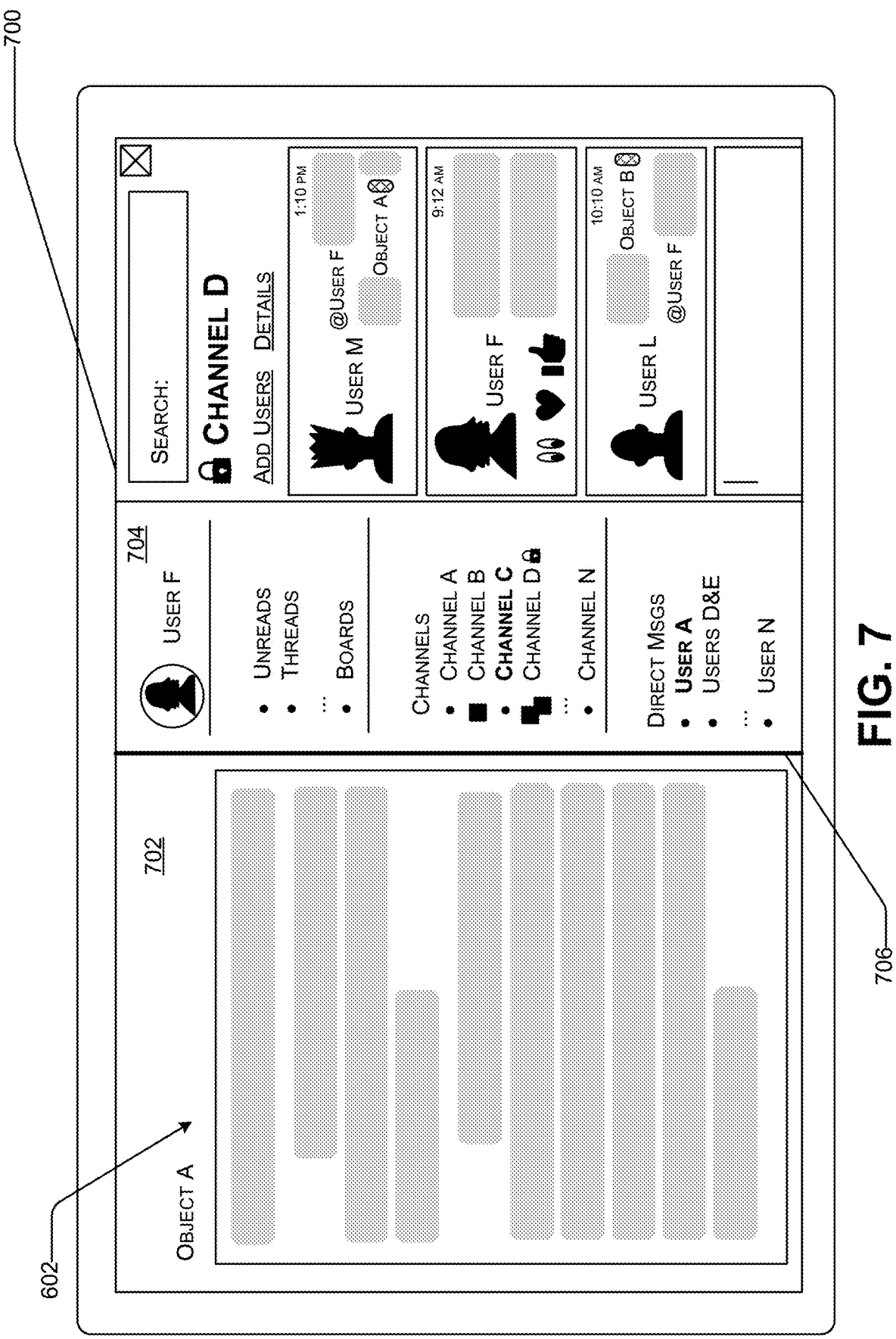
FIG. 7 illustrates an example of a user interface presented via a third-party platform, wherein functionality associated with a communication platform is integrated into the third-party platform.

FIG. 7 illustrates an example of a user interface 700 presented via a third-party platform, wherein functionality associated with a communication platform is integrated into the third-party platform. In some examples, based at least in part on detecting an input associated with the actuation mechanism 604 described above with reference to FIG. 6, a new user interface 700 can be presented by the communication platform (e.g., the new user interface 700 can be presented via a web application of the communication platform instead of the third-party platform). In such an example, the object associated with the third-party platform can be presented in a first section 702 of the user interface 700 and a group-based communication user interface associated with the communication platform can be presented via a second section 704 of the user interface 700. In at least one example, as described above, the first section 702 can be presented via a first frame (e.g., iframe) and the second section 704 can be presented via a second frame (e.g., iframe). In some examples, a user can interact with the first section 702 and the second section 704 independently, but within the user interface 700. That is, the user can access functionality associated with the third-party platform from within the communication platform. In some examples, the user interface 700 can include a resizing mechanism 706 that can be used to resize the first section 702 and/or the second section 704, as described above.

In some examples, based at least in part on detecting an input associated with the actuation mechanism 604 described above with reference to FIG. 6, the user interface 700 can be presented by the third-party platform. That is, in such an example, the user interface 700 can be generated based at least in part on an update to the user interface 600 described above with reference to FIG. 6. In such an example, the object associated with the third-party platform can be presented in a first section 702 of the user interface 700 and a group-based communication user interface associated with the communication platform can be presented via a second section 704 of the user interface 700. In at least one example, as described above, the first section 702 can be presented via a first frame (e.g., iframe) and the second section 704 can be presented via a second frame (e.g., iframe). In some examples, a user can interact with the first section 702 and the second section 704 independently, but within the user interface 700. That is, the user can access functionality associated with the communication platform from within the third-party application.

In some examples, a user can access the user interface 600, described above with reference to FIG. 6, from within the communication platform. For example, in some examples, a third-party object presented via the third section 300 can include an actuation mechanism to enable a user to leave the communication platform and open a third-party application associated with the third-party platform. When the third-party application opens, the user interface 600 can be presented to enable a user to access the third-party object and functionality associated with the communication platform from within the third-party application and user interface 600.

Figure 8:
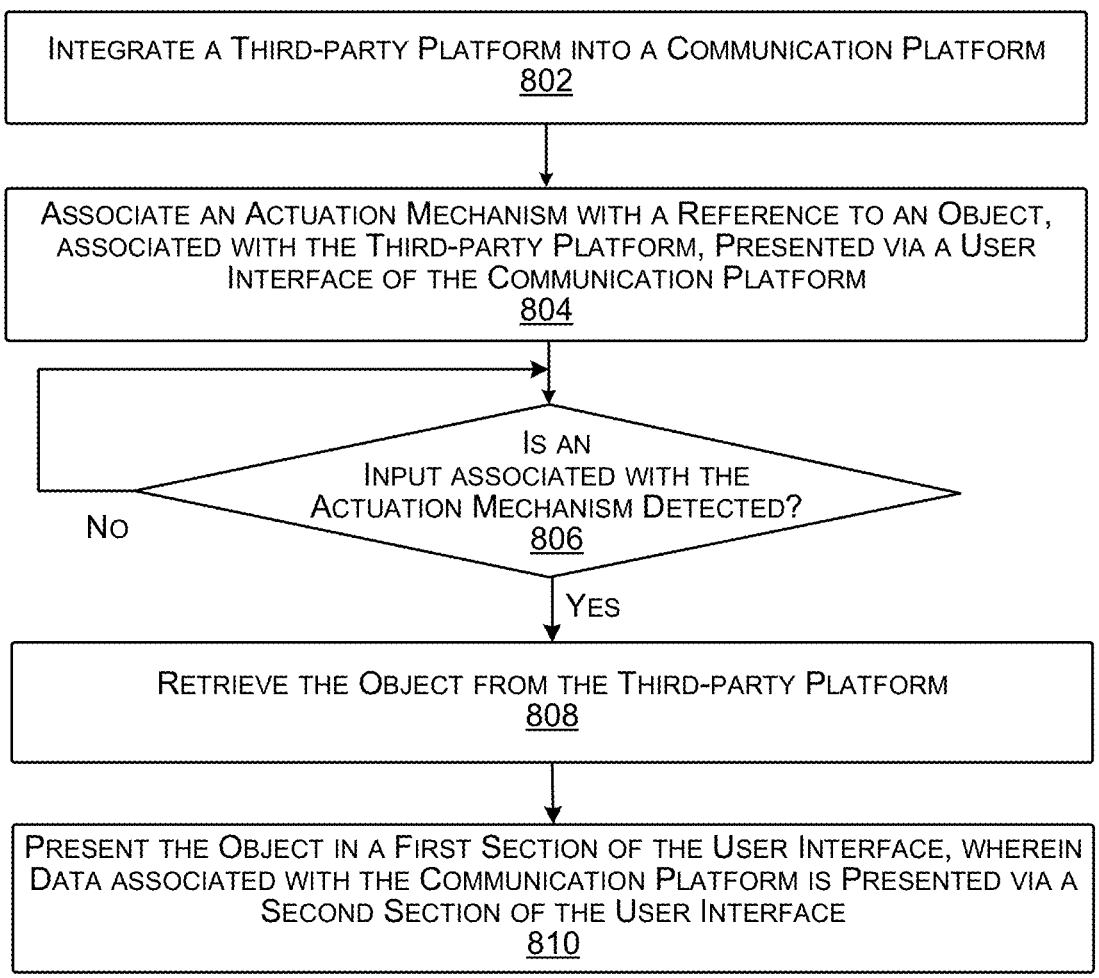
FIG. 8 illustrates an example process for presenting a third-party object via a user interface associated with a communication platform, as described herein.
Figure 9:
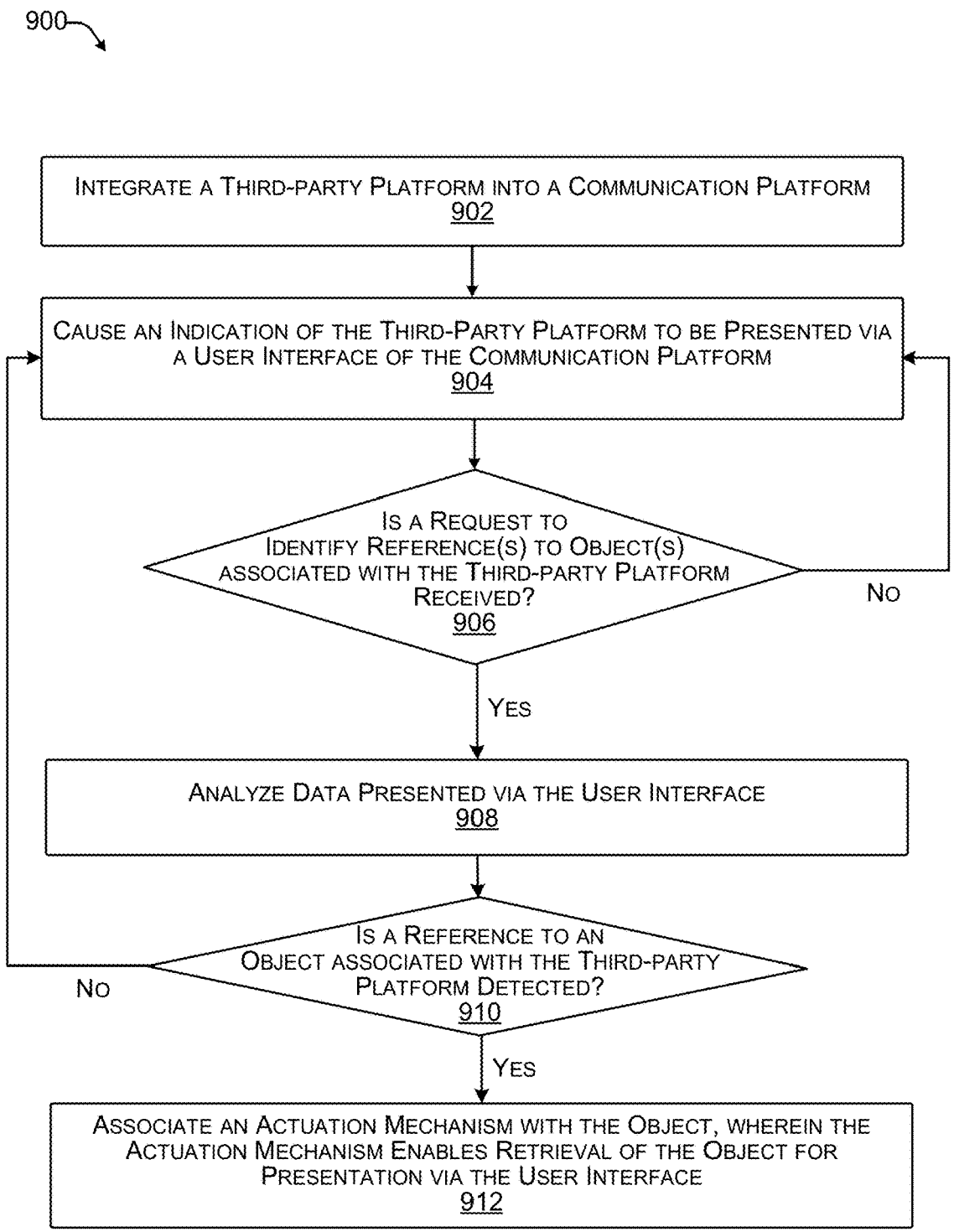
FIG. 9 illustrates an example process for annotating a user interface to enable access to third-party object(s) associated with the user interface, as described herein.
Figure 10:
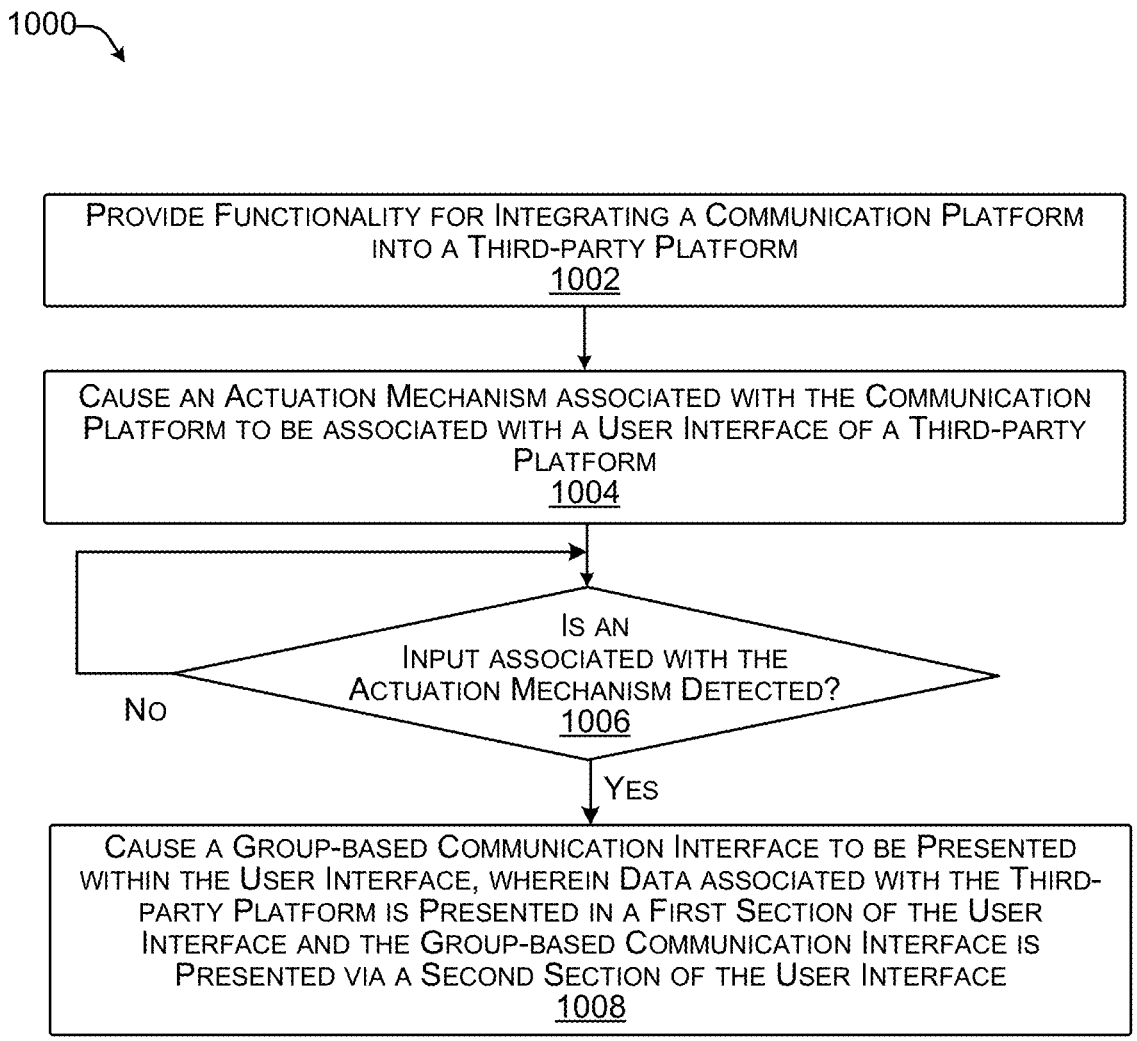
FIG. 10 illustrates an example process for causing a group-based communication user interface to be presented via a third-party platform, wherein functionality associated with a communication platform is integrated into the third-party platform, as described herein.

FIGS. 8-10 are flowcharts showing example processes involving techniques as described herein. The processes illustrated in FIGS. 8-10 are described with reference to components described above with reference to the environment 100 shown in FIG. 1 for convenience and ease of understanding. However, the processes illustrated in FIGS. 8-10 are not limited to being performed using the components described above with reference to the environment 100. Moreover, the components described above with reference to the environment 100 are not limited to performing the processes illustrated in FIGS. 8-10.

The processes in FIGS. 8-10 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 8-10 can be combined in whole or in part with each other or with other processes.

As noted above, the processes illustrated in FIGS. 8-10 are described with reference to components described above in the environment 100 shown in FIG. 1 for convenience and ease of understanding. FIG. 1, however, illustrates a single user computing device 104. In practice, the environment 100 can have multiple (e.g., tens of, hundreds of, thousands of, millions of, etc.) user computing devices that are each similarly configured to the user computing device 104.

FIG. 8 illustrates an example process 800 for presenting a third-party object via a user interface associated with a communication platform, as described herein.

At operation 802, the integration management component 116 can integrate a third-party platform into a communication platform. As described above, in some examples, the integration management component 116 can facilitate the integration of the third-party platform into the communication platform. In some examples, a third-party platform can be integrated into a web browser experience associated with the communication platform. For example, in some examples, a third-party platform can be integrated into the communication platform via a small software program (e.g., an extension), as described above. In at least one example, the extension can cause a frame to be loaded within a web browser within which the communication platform is accessible. In some examples, the frame can access content associated with the third-party platform and write content associated therewith into the frame. In some examples, a third-party platform can be integrated into a native application associated with the communication platform. For example, in some examples, a third-party platform can be integrated into the communication platform by embedding an embeddable browser (e.g., a webview) into a native application associated with the communication platform. In such examples, the native application can use the embeddable browser to display web content. That is, in such examples, the native application can have a browser engine embedded therein that can programmatically load content (e.g., object(s)) in a user interface, as described herein. In some examples, such content can be loaded into a frame.

At operation 804, the application 140, executable by the user computing device 104, can associate an actuation mechanism with a reference to an object, associated with the third-party platform, presented via a user interface of the communication platform. As described above, in at least one example, based at least in part on integrating the third-party platform with the communication platform, references to objects associated with the third-party platform can be annotated with an actuation mechanism. In some examples, the application 140 can analyze data associated with a user interface of the communication platform to identify references to objects. The application 140 can associate an actuation mechanism with a reference to an object in the user interface. The actuation mechanism can be associated with a link or other mechanism that, when actuated, can cause an associated object to be presented via the user interface.

In some examples, different users, communication channels, direct messages, groups (e.g., organizations, workspaces, etc.) can be associated with different permissions, which can indicate which third-party platforms are integrated and accessible to such entities. Such permissions can be associated with the permission data 126, as described above. In at least one example, if a third-party platform is not accessible to a particular entity (e.g., user, communication channel, direct message, group, etc.), an actuation mechanism may not be associated with a corresponding object and/or an actuation mechanism associated with the corresponding object may be disabled or otherwise indicate that the object cannot be accessed.

At operation 806, the application 140 can determine whether an input associated with the actuation mechanism is detected. In at least one example, the application 140 can detect an input associated with the actuation mechanism (e.g., the actuation mechanism has been actuated). If an input is not detected, the application 140 can determine that an input has not been detected and can return to operation 806 to await an indication of such an input.

At operation 808, the object can be retrieved from the third-party platform. In at least one example, based at least in part on determining that the actuation mechanism has been actuated, the application 140 can send a request to the third-party server(s) 123 to retrieve the object. In some examples, based at least in part on determining that the actuation mechanism has been actuated, the application 140 can cause a frame (e.g., an iframe) associated with the third-party platform and/or object to open within the user interface. In at least one example, the frame can send a request to the third-party server(s) 123 to retrieve the object. In some examples, the request and/or object can be routed through the integration management component 116 (e.g., from the application 140 and/or the frame). In at least one example, the request can be associated with an object identifier.

In some examples, prior to retrieving the object from the third-party platform, the component (e.g., the application 140, the integration management component 116, etc.) facilitating the retrieval can determine whether the requesting user, communication channel, direct message, group (e.g., organization, workspace, etc.), etc. has permission to access the object and/or the third-party platform. In some examples, the component can access permission data 126 to determine whether the requesting user, communication channel, direct message, group (e.g., organization, workspace, etc.), etc. has permission to access the object and/or the third-party platform. Based at least in part on determining that the requesting user, communication channel, direct message, group (e.g., organization, workspace, etc.), etc. has permission to access the object and/or the third-party platform, the object can be retrieved. However, if the requesting user, communication channel, direct message, group (e.g., organization, workspace, etc.), etc. does not have permission to access the object and/or the third-party platform, the component facilitating the retrieval can present an error or otherwise indicate that the access to the object is not permitted.

At operation 810, the application 140 present the object in a first section of the user interface, wherein data associated with the communication platform is presented via a second section of the user interface. Based at least in part on the object being retrieved, the application 140 can cause the object to be presented via a user interface of the communication platform via a frame (e.g., an iframe), as described above. In some examples, the object can be presented "in context" of the communication platform so that a user can interact with the communication platform and the object within a user interface of the communication platform. That is, as described and illustrated above, a group-based communication user interface can be presented via a first section (e.g., first frame) associated with the user interface and the object can be presented via a second section (e.g., second frame) associated with the user interface. In at least one example, the object can be interactable such that a user can open, view, and/or edit the object within the user interface of the communication platform (e.g., without leaving the communication platform).

In at least one example, operations 808 and 810 can be associated with the application 140 causing a frame to be presented via the user interface based at least in part on detecting input associated with the actuation mechanism. Based at least in part on causing the frame to be presented, the frame can request or otherwise point to data associated with the third-party platform, wherefrom the object can thus be retrieved. The object can then be presented via the frame, within the user interface, so that a user can open, view, and/or edit the object without leaving the communication platform.

As described above, in some examples, third-party object(s) and/or the presentation of third-party object(s) via a section of the user interface can be mapped to, or otherwise associated with, individual communication channels, direct messages, and/or groups (e.g., organizations, workspaces, etc.). For example, if the object presented via the first section (at operation 810) is mapped to, or otherwise associated with, a first workspace, so long as a user is interacting with the same workspace (e.g., navigating between different communication channels associated with the first workspace and/or direct messages associated with the first workspace), the object can continue to be presented via the first section. However, based at least in part on detecting that the user has navigated to a second workspace that is different than the first workspace, the application 140 can terminate the presentation of the object via the first section. In at least one example, if the application 140 receives a request to return to the first workspace, the object can again be presented via the first section. In some examples, a location within the object can be flagged, or otherwise identified, such that when the application 140 returns to the first workspace, the object can be presented via the first section at the flagged, or otherwise identified, location (e.g., so that the object opens at the same location within the object that the user was interacting with prior to navigating away from the first workspace).

Same or similar techniques can be applicable for navigating between different communication channels or direct messages within a group. For instance, if the object presented via the first section (at operation 810) is mapped to, or otherwise associated with, a first communication channel or first direct message, so long as a user is interacting with the same communication channel or direct message, the object can continue to be presented via the first section. However, based at least in part on detecting that the user has navigated to a second communication channel or second direct message that is different than the first communication channel or first direct message, the application 140 can terminate the presentation of the object via the first section. In at least one example, if the application 140 receives a request to return to the first communication channel or first direct message, the object can again be presented via the first section. In some examples, a location within the object can be flagged, or otherwise identified, such that when the application 140 returns to the first communication channel or first direct message, the object can be presented via the first section at the flagged, or otherwise identified, location (e.g., so that the object opens at the same location within the object that the user was interacting with prior to navigating away from the first communication channel or first direct message).

While operations 804-810 are described above as being performed by the application 140, in some examples, operations 804-810 can be performed by an additional or alternative functional component on the user computing device 104. Additionally or alternatively, in some examples, operations 804-810 can be performed by the integration management component 116. For example, the integration management component 116 can cause an actuation mechanism to be associated with a reference to an object presented via a user interface of the communication platform and can await an indication of whether an input associated with the actuation mechanism is detected. Based at least in part on receiving an indication that such an input was detected (e.g., from the user computing device 104), the integration management component 116 can retrieve the object, send the object to the user computing device 104, and cause the object to be presented in the first section. That is, the integration management component 116 can provide the object to the user computing device 104 and the application 140 can present the object, via a frame, for example, as described above.

FIG. 9 illustrates an example process 900 for annotating a user interface to enable access to third-party objects associated with the user interface, as described herein.

At operation 902, the integration management component 116 can integrate a third-party platform into a communication platform, as described above with reference to operation 802.

At operation 904, the integration management component 116 can cause an indication of the third-party platform to be presented via a user interface of the communication platform. In some examples, indications of third-party platforms integrated into the communication platform can be presented via a user interface associated with the communication platform. In some examples, such indications can be presented as information associated with a communication channel. In some examples, such indications can be presented via another feature of such a user interface, such as a board (e.g., a virtual space wherein data associated with one or more users, one or more communication channels, etc. can be aggregated), a sidebar or other section or sub-section of the user interface, or the like. In some examples, such indications can be associated with a textual element, a graphical element, a logo, or the like.

In some examples, integrated third-party platforms can be mapped to, or otherwise associated with, individual communication channels. That is, in some examples, based at least in part on a third-party platform being mapped to, or otherwise associated with, a first communication channel, an indication of a third-party platform can be presented via the user interface while data associated with a first communication channel is presented via the user interface. However, the indication of the third-party platform may not be presented via the user interface while data associated with a second communication channel is presented if the third-party platform is not mapped to, or otherwise associated with, the second communication channel. In some examples, such mapping, or other association, can be determined based at least in part on permissions data, which can be associated with individual communication channels, direct message(s), user(s), group(s) (e.g., workspace(s)), and/or the like.

At operation 906, the application 140 can determine whether a request to identify reference(s) to object(s) associated with the third-party platform is received. In some examples, a user can interact with the user interface to request that reference(s) to object(s) that are available via a third-party platform are annotated to indicate such. In some examples, a user can interact with one of the indications of a third-party platform to initiate such a request.

At operation 908, the application 140 can analyze data presented via the user interface. In at least one example, based at least in part on a request to identify such reference(s) to object(s) being received, the application 140 can analyze the data presented via the user interface to determine whether there are any reference(s) to object(s) associated with the third-party platform, as illustrated at operation 910. In some examples, such reference(s) can be associated with identifier(s) such as a uniform resource identifier or the like.

At operation 912, the application 140 can associate an actuation mechanism with the object, wherein the actuation mechanism enables retrieval of the object for presentation via the user interface. In at least one example, based at least in part on detecting a reference to an object associated with the third-party platform, the application 140 can cause an actuation mechanism to be associated with the object. The actuation mechanism can comprise a link or other mechanism that can cause the associated object to be presented via the user interface, as described herein.

In some examples, if no request to identify reference(s) to object(s) is received (e.g., at operation 906) and/or the user interface does not include any reference(s) to any object(s) associated with a third-party platform (e.g., at operation 910), the process can return to operation 904. In some examples, the process 900 can proceed from operation 902 to operation 908 (e.g., without performing operations 904 and/or 906). In such examples, based at least in part on integrating a third-party platform into the communication platform, the application 140 can automatically (e.g., without user input) cause reference(s) to object(s) associated with the user interface to be annotated with actuation mechanisms.

While operations 906-912 are described above as being performed by the application 140, in some examples, operations 906-912 can be performed by an additional or alternative functional component on the user computing device 104. Additionally or alternatively, in some examples, operations 906-912 can be performed by the integration management component 116. For example, the integration management component 116 can determine whether a request is received from the user computing device 104, wherein the request is to identify reference(s) to object(s) in the user interface associated with a third-party platform. The integration management component 116 can analyze data presented via the user interface and, if a reference to an object associated with the third-party platform is detected, the integration management component 116 can cause an actuation mechanism to be associated with the reference to the object presented via the user interface of the communication platform.

FIG. 10 illustrates an example process 1000 for causing a group-based communication user interface to be presented via a third-party platform, wherein functionality associated with a communication platform is integrated into the third-party platform, as described herein.

At operation 1002, the integration management component 116 can provide functionality for integrating a communication into a third-party platform. In some examples, the integration management component 116 can facilitate integration of functionality associated with the communication platform into a third-party platform. In some examples, the communication platform can be integrated into a web browser experience associated with a third-party platform. In some examples, the communication platform can be integrated into a third-party platform via a small software program (e.g., an extension), as described above. In some examples, a developer (associated with a third-party platform) can install such an extension into the third-party platform. In at least one example, the extension can cause a frame to be loaded within a web browser within which the third-party platform is accessible. In some examples, the frame can access content associated with the communication platform and write content associated therewith into the frame. In some examples, the communication platform can be integrated into a native application associated with the third-party platform. In some examples, the communication platform can be integrated into the third-party platform by embedding an embeddable browser (e.g., a webview) into a native application associated with the third-party platform. In such examples, the native application can use the embeddable browser to display web content. That is, in such examples, the native application can have a browser engine embedded therein that can programmatically load content (e.g., third-party object(s)) in a user interface, as described herein. In some examples, such content can be loaded into a frame.

At operation 1004, the integration management component 116 can cause an actuation mechanism associated with the communication platform to be associated with a user interface of a third-party platform. In an example where functionality associated with the communication platform is integrated into a third-party platform, a user interface of the third-party platform, which can be presented via an application, a web browser, or the like, can include an actuation mechanism associated with the communication platform. In at least one example, the integration management component 116 can cause such an actuation mechanism to be presented.

At operation 1006, the integration management component 116 can determine whether an input associated with the actuation mechanism is detected. In at least one example, based at least in part on receiving an indication that an input associated with the actuation mechanism has been detected, the third-party server(s) 123 can send an indication of such to the server(s) 102. The integration management component 116 can receive the indication and can cause a group-based communication user interface to be presented within the user interface, wherein data associated with the third-party platform is presented in a first section of the user interface and the group-based communication interface is presented via a second section of the user interface, as illustrated at operation 1008. That is, based at least in part on receiving an indication that the actuation mechanism has been actuated, the integration management component 116 can cause data associated with the communication platform to be presented via the user interface. In some examples, such data can be presented as a group-based communication user interface associated with the communication platform. In some examples, the group-based communication user interface can be presented via a frame (e.g., an iframe) within the user interface. In some examples, data associated with the third-party platform (e.g., an object associated therewith) can be presented via another frame within the user interface. As such, a user can interact with the third-party platform and the communication platform via a same user interface (e.g., without leaving the third-party platform).

In some examples, the user interface can be a new user interface presented by the communication platform (e.g., a web application associated with the communication platform can present the new user interface). The new user interface can replace the user interface with which the actuation mechanism is associated. The new user interface can have multiple sections, each which can be associated with a frame (e.g., iframe), that can present data associated respective platforms (e.g., the third-party platform and the communication platform). In some examples, based at least in part on detecting an input associated with a request to close the frame associated with the group-based communication user interface, the third-party platform can again present the user interface described above at operation 1004. That is, the previous user interface can be presented by the third-party platform.

In some examples, if no input is received and/or detected, the process 1000 can return to operation 1006 to await an indication of input associated with the actuation mechanism.

In some examples, a state of the communication platform section can be associated with a particular third-party page or site such that if a user navigates away from the third-party page or site when the communication platform section is associated with an open state, the communication platform section can be presented via the user interface when the user returns to the same third-party page or site at a later time. In some examples, if a third-party page or site is associated with a communication platform section associated with a closed state, the communication platform section may not be presented when the user returns to the page or site.

In some examples, a communication channel or direct message can be mapped to a third-party platform and/or object. For instance, if a communication channel or direct message is mapped to, or otherwise associated with, a third-party platform and/or object, so long as a user is interacting with the same third-party platform and/or object, the communication channel or direct message can continue to be presented via the second section. However, based at least in part on detecting that the user has navigated to a different third-party platform and/or object (e.g., associated with a different domain, for example), the communication channel or direct message may no longer be presented via the second section (and, in some examples, the second section may not be presented at all). In at least one example, if the third-party platform and/or object is later accessed, the communication channel or direct message can again be presented via the second section. In some examples, a location within communication channel or direct message can be flagged, or otherwise identified, such that when the third-party platform and/or object is later accessed, the communication channel or direct message can be presented via the second section at the flagged, or otherwise identified, location (e.g., so that the communication channel or direct message opens at the same location within the communication channel or direct message that the user was interacting with prior to navigating away from the third-party platform and/or object).

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A: A method for interacting with an object associated with a third-party platform in a group-based communication platform, the method comprising: associating an actuation mechanism with a reference to the object presented via a user interface of the group-based communication platform; based at least in part on detecting an input associated with the user interface, retrieving the object from the third-party platform; and presenting the object via the user interface, wherein one or more messages associated with the group-based communication platform are presented via a first section of the user interface and the object is presented via a second section of the user interface, and wherein the first section and the second section are presented simultaneously and are independently interactable from within the user interface of the group-based communication platform.

B: The method as paragraph A recites, wherein the one or more messages are associated with a communication channel of the group-based communication platform, and the first section is representative of the communication channel.

C: The method as paragraph A or B recites, wherein the one or more messages are associated with a direct message of the group-based communication platform, and the first section is representative of the direct message.

D: The method as any of paragraphs A-C recites, wherein the actuation mechanism is associated with a logo representative of the third-party platform.

E: The method as any of paragraphs A-D recites, wherein the object is presented via the second section for at least one of viewing, editing, or interacting with the object.

F: The method as any of paragraphs A-E recites, wherein the second section is associated with a resizing mechanism, the method further comprising: receiving an input associated with the resizing mechanism, wherein the input associated with the resizing mechanism causes the second section to expand or contract within the user interface; and resizing the first section and the second section based at least in part on receiving the input associated with the resizing mechanism.

G: The method as any of paragraphs A-F recites, further comprising, based at least in part on receiving a request to extract the second section from the user interface, causing the second section to be presented via a new user interface.

H: The method as any of paragraphs A-G recites, wherein the one or more messages are associated with at least one of a communication channel associated with a workspace or a direct message associated with the workspace, and wherein a permission associated with at least one of the communication channel, the direct message, or the workspace permits integration of the third-party platform.

I: A system comprising: one or more processors; and one or more non-transitory computer-readable media comprising instructions that, when executed by the one or more processors, cause the system to perform operations comprising: associating an actuation mechanism with a reference to an object associated with a third-party platform, wherein the object is presented via a user interface of a group-based communication platform; based at least in part on detecting an input associated with the user interface, causing the object to be retrieved from the third-party platform; and causing the object to be presented via the user interface, wherein one or more messages associated with the group-based communication platform are presented via a first section of the user interface and the object is presented via a second section of the user interface, and wherein the first section and the second section are presented simultaneously and are independently interactable from within the user interface of the group-based communication platform.

J: The system as paragraph I recites, wherein the one or more messages are associated with a communication channel of the group-based communication platform, and the first section is representative of the communication channel.

K: The system as paragraph I or J recites, wherein the one or more messages are associated with a direct message of the group-based communication platform, and the first section is representative of the direct message.

L: The system as any of paragraphs I-K recites, wherein the object is presented via the second section for at least one of viewing, editing, or interacting with the object.

M: The system as any of paragraphs I-L recites, wherein the second section is associated with a resizing mechanism, the operations further comprising: receiving an input associated with the resizing mechanism, wherein the input associated with the resizing mechanism causes the second section to expand or contract within the user interface; and resizing the first section and the second section based at least in part on receiving the input associated with the resizing mechanism.

N: The system as any of paragraphs I-M recites, the operations further comprising, based at least in part on receiving a request to extract the second section from the user interface, causing the second section to be presented via a new user interface.

O: The system as any of paragraphs I-N recites, wherein the one or more messages are associated with at least one of a communication channel associated with a workspace or a direct message associated with the workspace, and wherein a permission associated with at least one of the communication channel, the direct message, or the workspace permits integration of the third-party platform.

P: One or more non-transitory computer-readable media comprising instructions that, when executed by one or more processors, cause the one or more processors to perform operations comprising: associating an actuation mechanism with a reference to an object associated with a third-party platform, wherein the object is presented via a user interface of a group-based communication platform; based at least in part on detecting an input associated with the user interface, causing the object to be retrieved from the third-party platform; and causing the object to be presented via the user interface, wherein one or more messages associated with the group-based communication platform are presented via a first section of the user interface and the object is presented via a second section of the user interface, and wherein the first section and the second section are presented simultaneously and are independently interactable from within the user interface of the group-based communication platform.

Q: The one or more non-transitory computer-readable media as paragraph P recites, wherein the input is associated with the actuation mechanism, and wherein the object is presented via the second section for at least one of viewing, editing, or interacting with the object.

R: The one or more non-transitory computer-readable media as paragraph P or Q recites, wherein the one or more messages are associated with (i) a communication channel of the group-based communication platform, and the first section is representative of the communication channel, or (ii) wherein the one or more messages are associated with a direct message of the group-based communication platform, and the first section is representative of the direct message.

S: The one or more non-transitory computer-readable media as any of paragraphs P-R recites, the operations further comprising, based at least in part on receiving a request to extract the second section from the user interface, causing the second section to be presented via a new user interface.

T: The one or more non-transitory computer-readable media as any of paragraphs P-S recites, wherein the one or more messages are associated with at least one of a communication channel associated with a workspace or a direct message associated with the workspace, and wherein a permission associated with at least one of the communication channel, the direct message, or the workspace permits integration of the third-party platform.

U. The one or more non-transitory computer-readable media as any of paragraphs P-T recites, wherein the one or more messages are associated with at least one of a communication channel associated with a workspace or a direct message associated with the workspace, the operations further comprising: receiving a request to access a different communication channel associated with the workspace or a different direct message associated with the workspace; updating data presented via the first section based at least in part on receiving the request; and maintaining, based at least in part on a determination that the different communication channel or the different direct message is associated with the workspace, presentation of the object via the second section.

V. The one or more non-transitory computer-readable media as any of paragraphs P-T recites, wherein the one or more messages are associated with a first workspace, the method further comprising: receiving a request to access a second workspace; and ceasing, based at least in part on a determination that the second workspace is different than the first workspace, presentation of the second section.

W. A method comprising: providing functionality for integrating a group-based communication platform into a third-party platform; causing an actuation mechanism associated with the group-based communication platform to be associated with a user interface of the third-party platform; and based at least in part on detecting an input associated with the actuation mechanism, causing a group-based communication interface to be presented within the user interface, wherein data associated with the third-party platform is presented via a first section within the user interface and the group-based communication interface is presented via a second section within the user interface, and wherein the first section and the second section are presented at a same time and are independently interactable.

X. One or more non-transitory computer-readable media comprising instructions that, when executed by one or more processors, cause the one or more processors to perform operations comprising: providing functionality for integrating a group-based communication platform into a third-party platform; causing an actuation mechanism associated with the group-based communication platform to be associated with a user interface of the third-party platform; and based at least in part on detecting an input associated with the actuation mechanism, causing a group-based communication interface to be presented within the user interface, wherein data associated with the third-party platform is presented via a first section within the user interface and the group-based communication interface is presented via a second section within the user interface, and wherein the first section and the second section are presented at a same time and are independently interactable.

Y. A system comprising: one or more processors; and one or more non-transitory computer-readable media comprising instructions that, when executed by the one or more processors, cause the system to perform operations comprising: providing functionality for integrating a group-based communication platform into a third-party platform; causing an actuation mechanism associated with the group-based communication platform to be associated with a user interface of the third-party platform; and based at least in part on detecting an input associated with the actuation mechanism, causing a group-based communication interface to be presented within the user interface, wherein data associated with the third-party platform is presented via a first section within the user interface and the group-based communication interface is presented via a second section within the user interface, and wherein the first section and the second section are presented at a same time and are independently interactable.

While the example clauses described above are described with respect to one particular implementation, it should be understood that, in the context of this document, the content of the example clauses can also be implemented via a method, device, system, a computer-readable medium, and/or another implementation. Additionally, any of examples A-Y may be implemented alone or in combination with any other one or more of the examples A-Y.

What is claimed is:

1. A method for interacting with an object in a group-based communication platform, the method comprising:
    presenting, via a user interface on a display device, one or more messages associated with a communication channel or a direct message of the group-based communication platform, wherein at least one of the one or more messages includes a representation of an object associated with a third-party application;
    based at least in part on detecting user input on the representation of the object for retrieving the object of the third-party application from a third-party platform, and in response to the user input:
        retrieving the object from the third-party platform;
        causing the one or more messages associated with the communication channel or the direct message of the group-based communication platform to be presented in a first section of a plurality of sections, wherein the user interface is partitioned into the plurality of sections; and
    causing the object retrieved from the third-party platform to be presented in a second section of the plurality of sections, and wherein the first section and the second section are presented simultaneously and are independently interactable within the user interface.

2. The method as claim 1 recites, wherein the one or more messages are associated with the communication channel of the group-based communication platform, and the first section is associated with the communication channel.

3. The method as claim 1 recites, wherein the one or more messages are associated with the direct message of the group-based communication platform, and the first section is associated with the direct message.

4. The method as claim 1 recites, wherein the representation of the object is associated with a logo representative of the third-party application.

5. The method as claim 1 recites, wherein the object is presented via the second section for at least one of viewing, editing, or interacting with the object.

6. The method as claim 1 recites, wherein the second section is associated with a resizing mechanism, wherein the user input comprises a first user input, and the method further comprising:

receiving a second user input associated with the resizing mechanism, wherein the second user input causes the second section to expand or contract within the user interface; and
    resizing the first section and the second section based at least in part on receiving the second user input.

7. The method as claim 1 recites, wherein the user input comprises a first user input, and the method further comprising, based at least in part on a second user input associated with receiving a request to extract the second section from the user interface, causing the second section to be presented via a new user interface.

8. The method as claim 1 recites, wherein the one or more messages are associated with at least one of the communication channel associated with a workspace or the direct message associated with the workspace, and wherein a permission associated with at least one of the communication channel, the direct message, or the workspace permits integration of the third-party platform.

9. The method as claim 1 recites, wherein the object, as presented via the second section of the user interface, is interactable such that content of the object is interactable via the user interface of the group-based communication platform without leaving the group-based communication platform.

10. The method as claim 1 recites, wherein the object is at least one of written into or loaded into the second section from the third-party platform via an interface enabling integration of the third-party platform with the group-based communication platform.

11. A system comprising:
    one or more processors; and
    one or more non-transitory computer-readable media comprising instructions that, when executed by the one or more processors, cause the system to perform operations comprising:
        presenting, via a user interface on a display device, one or more messages associated with a communication channel or a direct message of a group-based communication platform, wherein at least one of the one or more messages includes a representation of an object associated with a third-party application;
        based at least in part on detecting user input on the representation of the object for retrieving the object of the third-party application from a third-party platform, and in response to the user input:
            causing the object to be retrieved from the third-party platform;
            causing the one or more messages associated with the communication channel or the direct message of the group-based communication platform to be presented in a first section of a plurality of sections, wherein the user interface is partitioned into the plurality of sections; and
        causing the object retrieved from the third-party platform to be presented in a second section of the plurality of sections, wherein the first section and the second section are presented simultaneously and are independently interactable within the user interface.

12. The system as claim 11 recites, wherein the one or more messages are associated with the communication channel of the group-based communication platform, and the first section is associated with the communication channel, and wherein the object is presented via the second section for at least one of viewing, editing, or interacting with the object.

13. The system as claim 11 recites, wherein the one or more messages are associated with the direct message of the group-based communication platform, and the first section is associated with the direct message, and wherein the object is presented via the second section for at least one of viewing, editing, or interacting with the object.

14. The system as claim 11 recites, wherein the second section is associated with a resizing mechanism, wherein the user input comprises a first user input, and the operations further comprising:

receiving a second user input associated with the resizing mechanism, wherein the second user input causes the second section to expand or contract within the user interface; and resizing the first section and the second section based at least in part on receiving the second user input.

15. The system as claim 11 recites, wherein the user input comprises a first user input, and the operations further comprising, based at least in part on a second user input associated with receiving a request to extract the second section from the user interface, causing the second section to be presented via a new user interface.

16. The system as claim 11 recites, wherein the one or more messages are associated with at least one of the communication channel associated with a workspace or the direct message associated with the workspace, and wherein a permission associated with at least one of the communication channel, the direct message, or the workspace permits integration of the third-party platform.

17. One or more non-transitory computer-readable media comprising instructions that, when executed by one or more processors, cause the one or more processors to perform operations comprising:

presenting, via a user interface on a display device, one or more messages associated with a communication channel or a direct message of the group-based communication platform, wherein at least one of the one or more messages includes a representation of an object associated with a third-party application;

based at least in part on detecting user input on the representation of the object for retrieving the object of the third-party application from a third-party platform, and in response to the user input:

causing the object to be retrieved from the third-party platform;

causing the one or more messages associated with the communication channel or the direct message of the group-based communication platform to be presented in a first section of a plurality of sections, wherein the user interface is partitioned into the plurality of sections; and causing the object retrieved from the third-party platform to be presented in a second section of the plurality of sections, wherein the first section and the second section are presented simultaneously and are independently interactable within the user interface.

18. The one or more non-transitory computer-readable media as claim 17 recites, wherein the object is presented via the second section for at least one of viewing, editing, or interacting with the object.

19. The one or more non-transitory computer-readable media as claim 17 recites, wherein the one or more messages are associated with (i) the communication channel of the group-based communication platform, and the first section is associated with the communication channel, or (ii) wherein the one or more messages are associated with the direct message of the group-based communication platform, and the first section is associated with the direct message.

20. The one or more non-transitory computer-readable media as claim 17 recites, wherein the one or more messages are associated with at least one of the communication channel associated with a workspace or the direct message associated with the workspace, and wherein a permission associated with at least one of the communication channel, the direct message, or the workspace permits integration of the third-party platform.

\* \* \* \* \*